(12) United States Patent  
Tsuboi et al.

(10) Patent No.: US 6,423,443 B1
(45) Date of Patent: Jul. 23, 2002

(54) BATTERY MOUNTING STRUCTURE IN POWER ASSISTED BICYCLE

(75) Inventors: Masaharu Tsuboi; Seishi Miura, both of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/577,564

(22) Filed: May 25, 2000

(30) Foreign Application Priority Data

May 25, 1999 (JP) .......................................... 11-145671

(51) Int. Cl.[7] ............................................... H01M 2/10
(52) U.S. Cl. ......................... 429/98; 429/100; 180/68.5
(58) Field of Search .......................... 429/96, 98, 100; 180/68.5

(56) References Cited

U.S. PATENT DOCUMENTS 3,370,987 A * 2/1968 Rush ........................... 429/98
4,044,852 A * 8/1977 Lewis et al. ................. 180/68.5
4,863,812 A * 9/1989 Ueda et al. ............. 429/100 X
5,474,150 A * 12/1995 Mabuchi ................. 180/68.5 X
5,789,898 A * 8/1998 Suzuki et al. ........... 429/100 X
6,095,270 A * 8/2000 Ishikawa .................... 180/68.5

FOREIGN PATENT DOCUMENTS

| JP | A5-319104 | 12/1993 | |
| JP | 08-226382 | * 2/1996 | ........... H01M/2/10 |
| JP | 2-623050 | 4/1997 | |
| JP | 10-181651 | * 7/1998 | ........... H01M/2/10 |

* cited by examiner

Primary Examiner—Stephen Kalafut
(74) Attorney, Agent, or Firm—Birch, Stewart, Kolasch & Birch, LLP.

(57) ABSTRACT

A battery mounting structure for a power-assisted bicycle which can securely and easily detachably support a battery on the bicycle. The battery holder includes a bottom plate portion for receiving the battery, and a stop ring for securing an upper portion of the battery to the mounting structure. The stop ring is pivotably connected to a buckle, and can be tightened by moving the buckle to a locking position.

13 Claims, 22 Drawing Sheets

BATTERY MOUNTING STRUCTURE IN POWER ASSISTED BICYCLE

BACKGROUND OF THE INVENTION

1. Field of the Invention

The present invention relates to a battery mounting structure in a power-assisted bicycle, and more particularly to a battery mounting structure capable of securely and easily detachably holding a battery.

2. Background Art

A battery mounted on a power-assisted bicycle must be firmly fixed so as not to be easily separated from the bicycle frame during travel over rough roads or when the bicycle falls over. In addition, the battery should be theft resistant. However, it is also desirable that the battery be easily detachable from and attachable to the bicycle frame for recharging.

A conventional battery mounting structure in a power-assisted bicycle is described in Japanese Patent No. 262305. In this mounting structure, a clamp mechanism is provided on a battery case, and a bicycle frame has a shape corresponding to the battery case having external electrodes. Thus, the battery case is fixed to the bicycle frame using the clamp mechanism.

It is desirable to provide a power-assisted bicycle which is both versatile and inexpensive, by mounting a power unit and a battery on an existing bicycle frame without extensively changing the design of the existing bicycle frame. This modification also requires the introduction of the assist power into the chain line.

However, the bicycle frame in the above patent must have a shape corresponding to the battery case, and an existing bicycle frame cannot be utilized.

Further, the battery itself is accommodated in the battery case when putting it into a distribution channel, or setting it into a recharger such as a battery station. Accordingly, it is desirable to reduce the number and size of projections on the battery case and to reduce the weight of the battery case accommodating the battery.

In the above device, however, the clamp mechanism provided on the battery case is a projection, causing inconvenience in handling the battery, and also adding weight.

It is accordingly an object of the present invention to provide a battery mounting structure which can securely and easily detachably hold a battery to a bicycle frame without adding excessive weight.

SUMMARY OF THE INVENTION

In accordance with the present invention, a battery mounting structure in a powerassisted bicycle detachably secures a battery mounted on a bicycle frame. The battery mounting structure includes a battery holder fixed to a seat post forming a part of the bicycle frame on one of the front and rear sides of the seat post. The battery holder includes at least a bottom plate portion for receiving the battery; a buckle provided on the other of the front and rear sides of the seat post and pivotably supported to the seat post by a lateral pivot shaft; and a stop ring for locking the battery received in the bottom plate portion of the battery holder in cooperation with pivotal movement of the buckle.

With this configuration, the battery can be securely and easily detachably held to the bicycle frame without the provision of any projections such as a clamp mechanism. This reduces the weight of the mounting structure.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
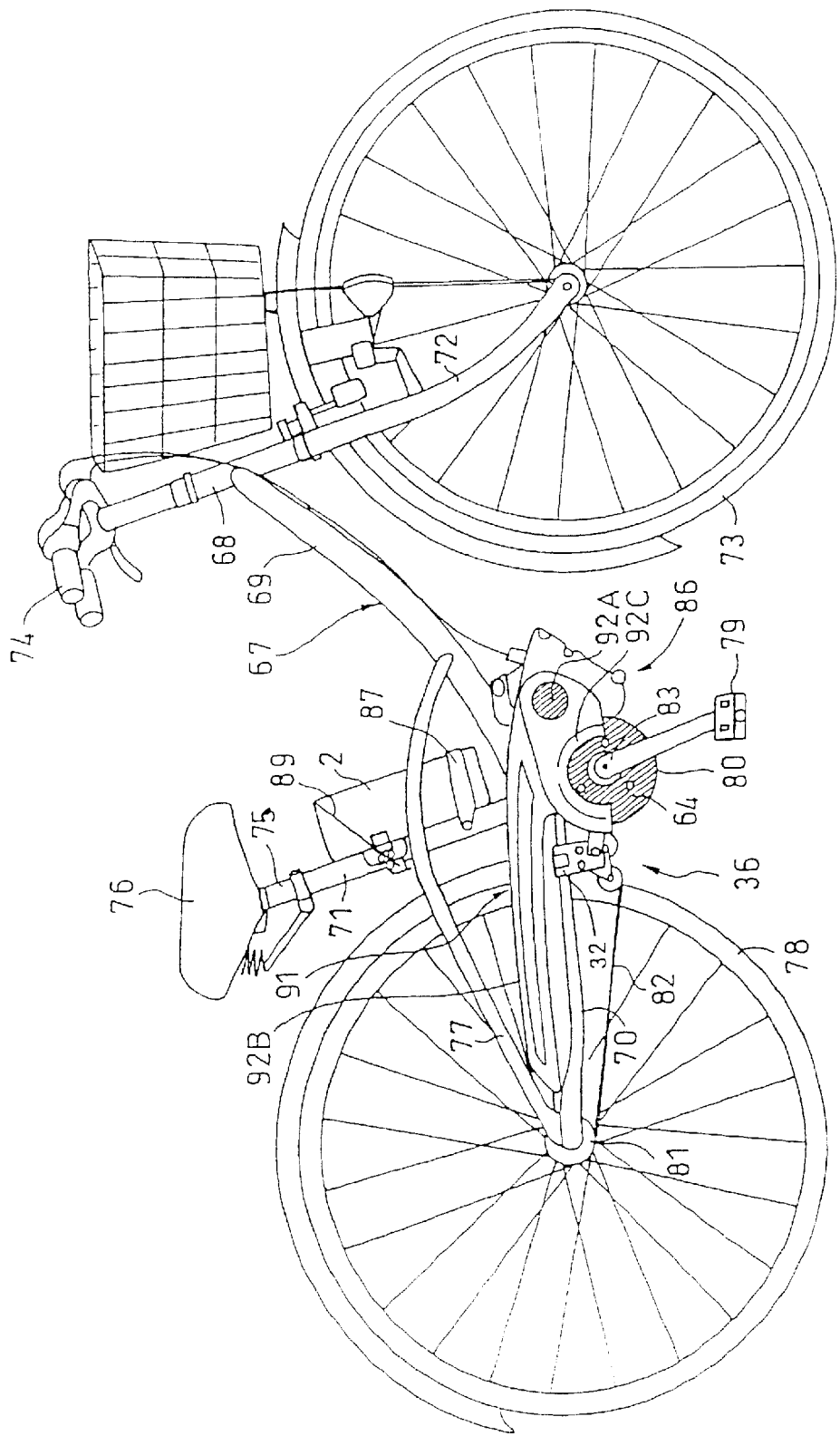
FIG. 1 is a side view of a power-assisted bicycle (F/F structure) according to a first embodiment of the present invention.

FIG. 1 is a side view of a power-assisted bicycle according to a first embodiment of the present invention. The power-assisted bicycle shown in FIG. 1 has an F/F structure. The term "F/F structure" is derived from the fact that a battery 2 is mounted on the front side (F) of a seat post 71 and the assist power generated by a power unit 86 is input into a chain line at a position on the front side (F) of a crankshaft 83.

Figure 2:
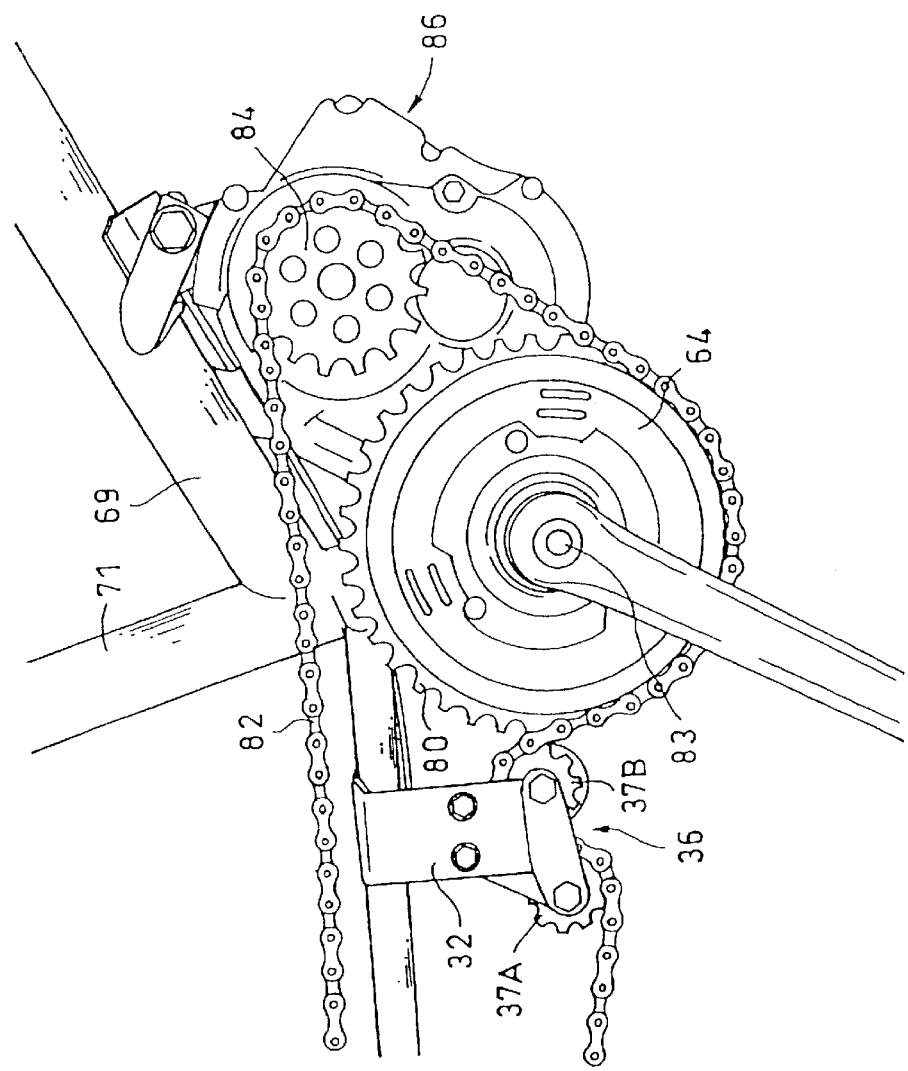
FIG. 2 is an enlarged side view of a pedal sprocket and a drive sprocket in the power-assisted bicycle shown in FIG. 1.
Figure 3:
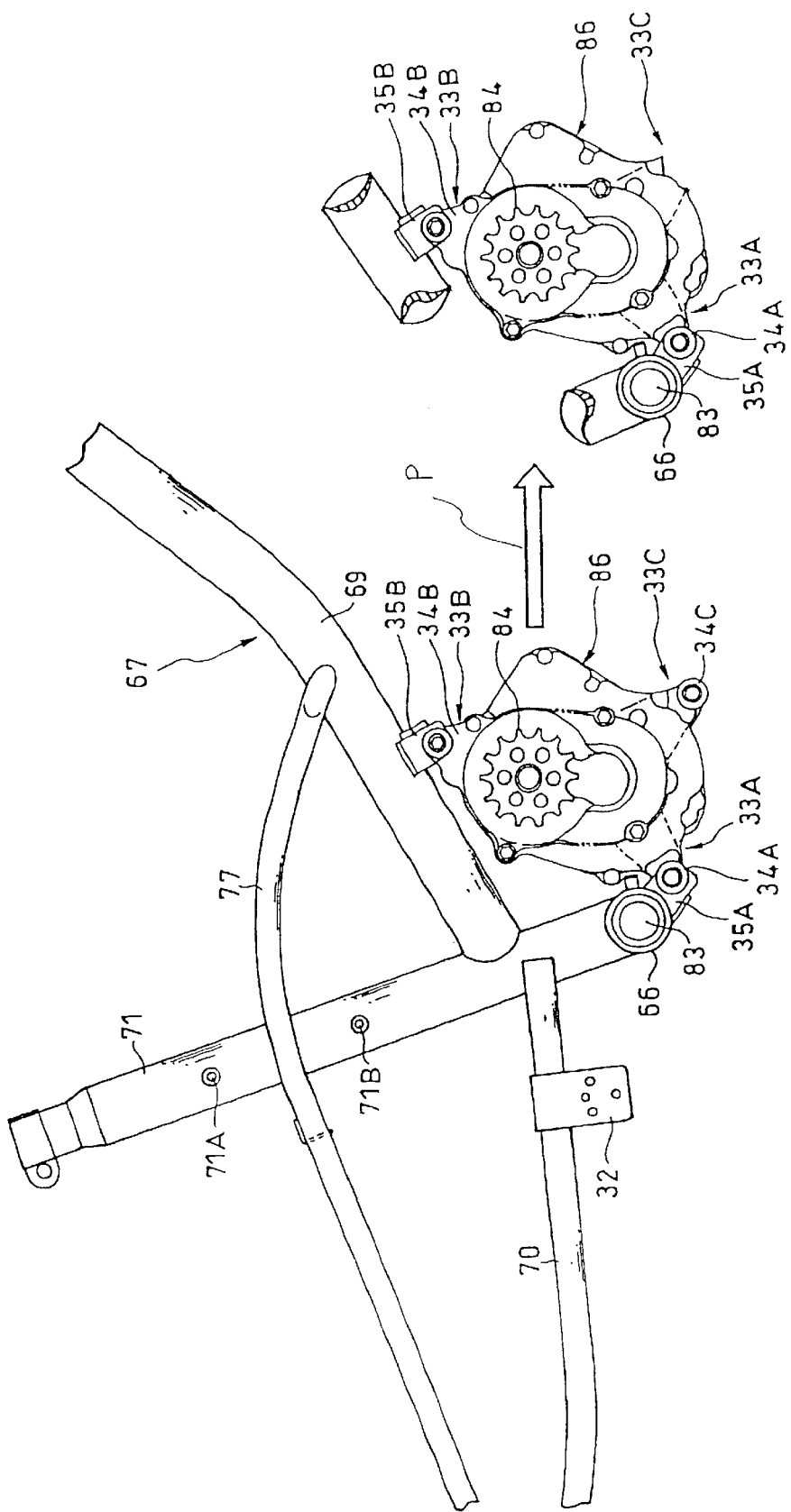
FIG. 3 is an enlarged side view of a mounting structure of a power unit to a bicycle frame in the power-assisted bicycle shown in FIG. 1.

FIG. 2 is an enlarged side view of a portion of the power-assisted bicycle shown in FIG. 1 on the periphery of the crankshaft 83 with a chain cover 91 removed, and FIG. 3 is a similar side view showing a fixing method for the power unit 86 to a bicycle frame 67.

The bicycle frame 67 in this embodiment is an existing frame designed and manufactured for a conventional bicycle. That is, the bicycle frame 67 includes a head pipe 68 forming a front end, a down pipe 69 extending rearwardly so as to be inclined downwardly from the head pipe 68, a support pipe 66 (see FIG. 3) fixed to the rear end of the down pipe 69 and extending in the lateral direction of the bicycle, and a seat post 71 extending upwardly from the support pipe 66.

A front fork 72 is steerably supported to the head pipe 68, and a front wheel 73 is rotatably supported to the lower ends of the front fork 72. A steering handle 74 is provided at the upper end of the front fork 72. A pair of right and left rear forks 70 extend rearwardly from the seat post 71, and a rear drive wheel 78 is rotatably supported to the rear ends of the rear forks 70. A pair of right and left stays 77 extend from the rear ends of the rear forks 70 through the seat post 71 to the down pipe 69. A support shaft 75 having an upper end supporting a seat 76 is fitted with the seat post 71 so that the vertical position of the seat 76 can be adjusted.

A battery 2 for supplying electric power to the power unit 86 is detachably mounted by a battery holder 87 on the front side of the seat post 71 at a position below the seat 76. The battery holder 87 is fixed to the seat post 71 at two pairs of bosses 71A and 71B, each pair being formed on each lateral side of the seat post 71.

The crankshaft 83 extends coaxially through the support pipe 66 of the bicycle frame 67, and a pair of crank pedals 79 are connected to the right and left ends of the crankshaft 83. A depression force applied to the crank pedals 79 is transmitted to the crankshaft 83, and is then input through a pedal sprocket 80 into an endless chain 82. A sprocket cover 64 having the same color coating as that of the bicycle frame 67 is mounted on the pedal sprocket 80.

The power unit 86 has a mounting structure such that it can be applied to various existing bicycle frames by minor machining or other alterations. As shown in FIG. 3, the power unit 86 has at least three boss forming spaces 33A, 33B, and 33C for forming bosses 34 (34A, 34B, and 34C) to be fixed to the bicycle frame 67. Any two of the bosses 34 are selectively used according to the structure and shape of a bicycle frame to which the power unit 86 is to be applied, and the selected bosses 34 are fixed to the bicycle frame 67. The boss forming spaces 33A, 33B, and 33C are located so that a virtual triangle is formed by the line segments connecting the boss forming spaces 33A, 33B, and 33C.

The support pipe 66 and the down pipe 69 of the bicycle frame 67 are provided with flanges 35A and 35B, respectively. The flanges 35A and 35B are fixed to the bicycle frame 67 by a suitable method such as welding. The power unit 86 is fixed in position and attitude to the bicycle frame 67 by bolting the two bosses 34A and 34B formed at the positions 33A and 33B to the flanges 35A and 35B, respectively, so that a drive sprocket 84 in the power unit 86 comes into mesh with the chain 82 at a position on the front side of the crankshaft 83.

The idle boss 34C at the boss forming space 33C of the power unit 86 may be formed as the other bosses 34A and 34B as shown in FIG. 3, on the left side of arrow P. Alternatively, the unrequired boss 34C for fixing of the power unit 86 to the bicycle frame 67 may not be formed at the boss forming space 33C as shown in FIG. 3, on the right side of the arrow P, by selectively forming only the bosses 34A and 34B at the boss forming spaces 33A and 33B, respectively, in casting (or forging, etc.) a case of the power unit 86.

The endless chain 82 is wrapped around the pedal sprocket 80, the drive sprocket 84 in the power unit 86, and a driven sprocket 81 mounted on the axle of the rear wheel 78. A tensioner 36 for applying a tension to the chain 82 is meshed between the pedal sprocket 80 and the driven sprocket 81. The tensioner 36 has two sprockets 37A and 37B meshing with the chain 82. The tensioner 36 is bolted to a boss 32 formed on the right rear fork 70 of the bicycle frame 67.

In the above-mentioned structure, the power unit 86 is fixed to an existing bicycle frame designed and manufactured for a conventional bicycle, and the assist power generated by the power unit 86 is input through the drive sprocket 84 to the chain line. Not only the pedal sprocket 80 and a stretched portion of the chain 82 extend between the pedal sprocket 80 and the driven sprocket 81, but also the drive sprocket 84 must be covered with a chain cover.

In this embodiment, the chain cover 91 has an integral structure composed of a drive sprocket cover portion 92A for covering the drive sprocket 84, a chain cover portion 92B for covering the stretched portion of the chain 82, and a pedal sprocket cover portion 92C for covering an upper half of the pedal sprocket 80. With this structure, the chain and each sprocket of a power-assisted bicycle so configured (modified) as to input the assist power into the chain line, can be simply and reliably covered without an increase in the number of parts.

However, in the above structure, there is a possibility that the shape of the chain cover 91 may appear inconsistent with the shape of a conventional bicycle.

To accommodate this problem, the drive sprocket cover portion 92A for covering the drive sprocket 84 may be formed as a circular portion subjected to coloring and surface roughening so as to correspond to the outside shape of the drive sprocket 84, the circular portion improving the appearance of the bicycle.

Figure 4:
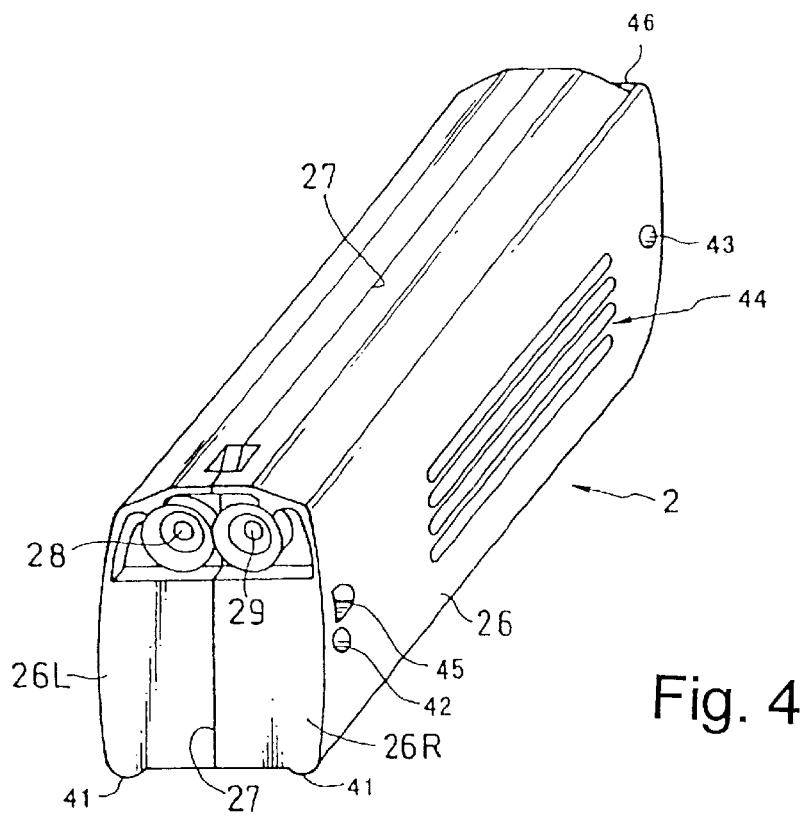
FIG. 4 is a perspective view of a battery.
Figure 5:
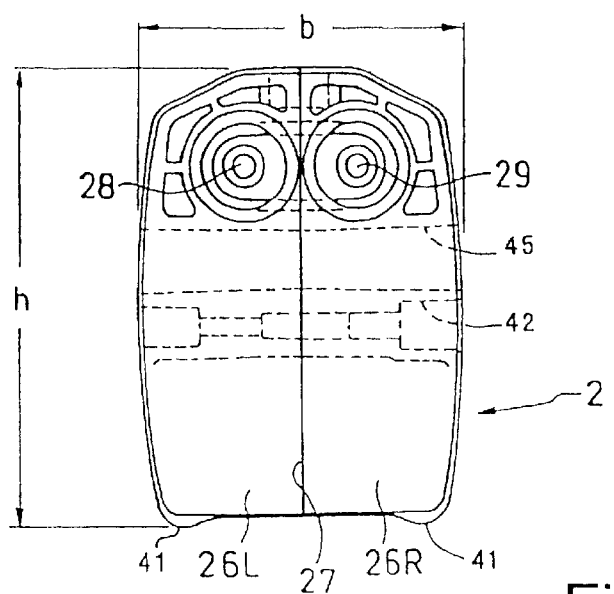
FIG. 5 is a front elevation of the battery.

FIG. 4 is a perspective view of the battery 2, and FIG. 5 is a front elevational view of the battery 2. The battery 2 has a plurality of battery cells (not shown) and a substantially rectangular prismatic battery pack 26 accommodating the battery cells. The battery pack 26 is composed of two pack components 26R and 26L facing each other on a surface 27 extending in the longitudinal direction of the battery 2. The pack components 26R and 26L are symmetrical with respect to the surface 27.

A pair of terminals 28 and 29 are respectively connected to an anode and a cathode of the unit of the battery cells. The terminal 28 and 29 are exposed to the front surface of the battery 2 so as to be symmetrical with respect to the surface 27. The top surface of the battery pack 26 near its front end surface is formed with a notch 30 for engaging a locking device provided in a slot 4. Further, the bottom surface of the battery pack 26 along the opposite sides is formed with two parallel ridges 41 extending in the longitudinal direction of the battery 2, so as to ensure both the slidability of the battery 2 on an inner wall of the slot 4 in inserting the battery 2 into the slot 4, and the stability of the battery 2 inserted in the slot 4.

The battery components 26R and 26L can be integrated together by bolts (not shown) engaged into tapped holes 42 and 43. Each side surface of the battery pack 26 is formed with grooves 44 for easy handling and carriage of the battery 2, thereby contributing to the grip of the battery 2. Further, the size of the battery pack 26 in cross section is of palm size so that an operator can easily grip the battery 2. For example, as shown in FIG. 5, the height h is set to about 80 mm and the breadth b is set to about 55 mm.

The battery pack 26 is further formed with a through hole 45. The through hole 45 is used for passing a wire or rope as a part of battery locking means therethrough in mounting the battery 2 on the battery holder 87. Further, a recess 46 is formed along the upper rear corner of the battery pack 26 as viewed in FIG. 4. The recess 46 functions as a catch for use in fixing the battery 2 to the bicycle frame after mounting the battery 2 onto the battery holder 87.

Figure 6:
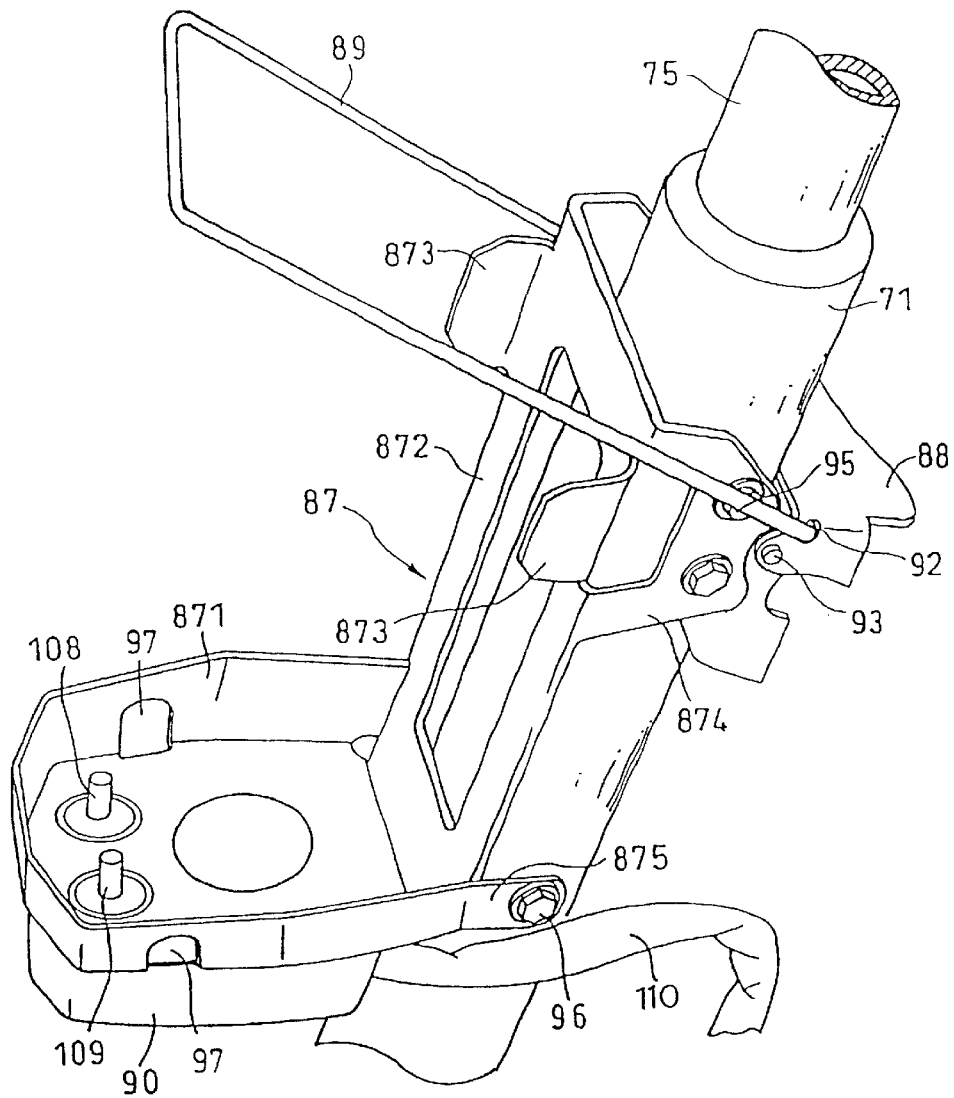
FIG. 6 is a perspective view of a battery holder.
Figure 7:
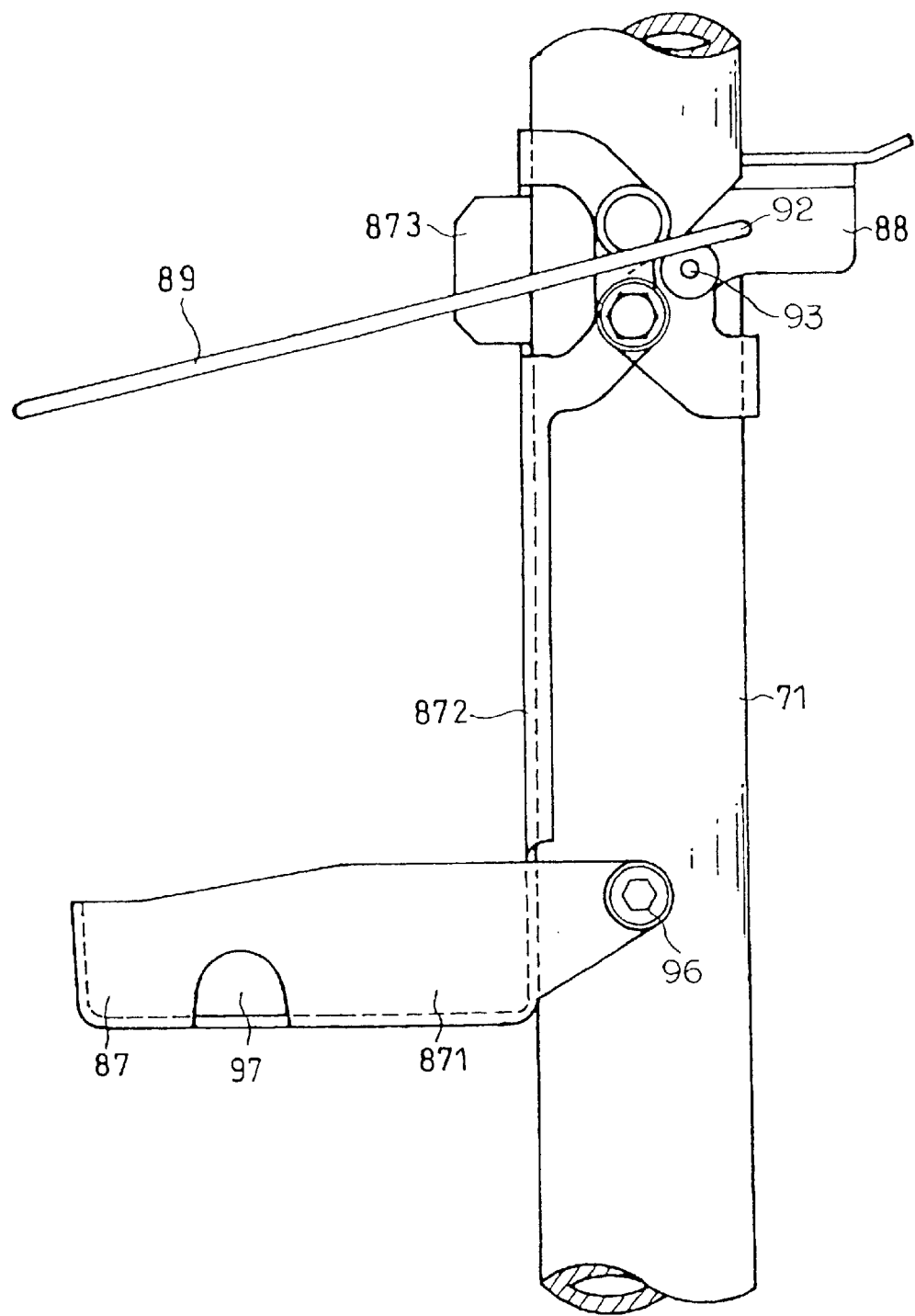
FIG. 7 is a side view of the battery holder.
Figure 8:
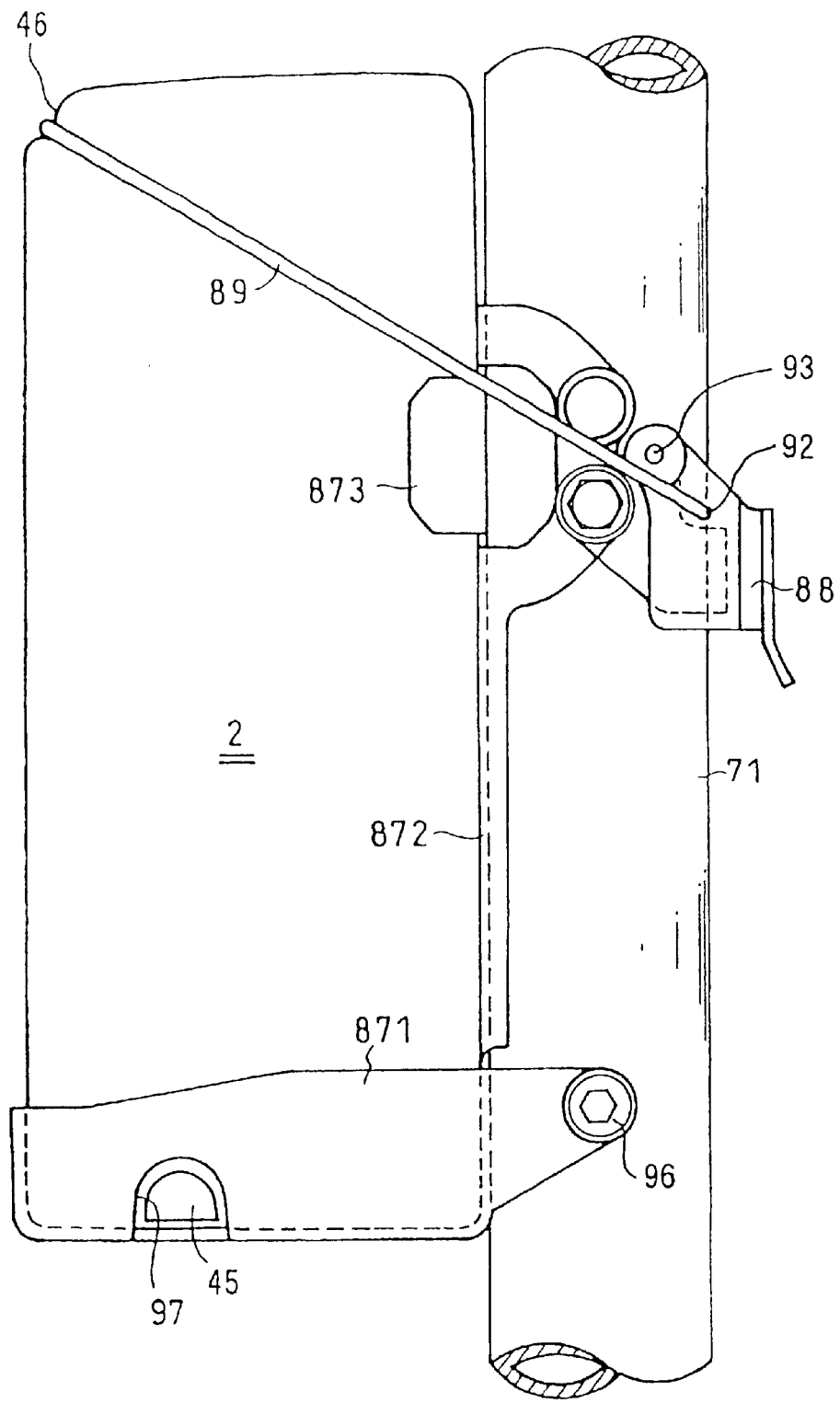
FIG. 8 is a side view of the battery holder with the battery mounted thereon.

FIG. 6 is a perspective view of the battery holder 87, FIG. 7 is a side view of the battery holder 87 where the battery 2 is not mounted thereon, and FIG. 8 is a side view of the battery holder 87 where the battery 2 is mounted thereon.

The battery holder 87 of this embodiment includes a bottom plate portion 871 for receiving the battery 2, a back plate portion 872 extending upward from a rear side surface of the bottom plate portion 871, a pair of right and left side plate portions 873 formed by cutting and bending opposite side portions of the back plate portion 872 near its upper end for positioning the battery 2 in its lateral direction, a pair of right and left first flange portions 874 bent in a direction opposite to that of the side plate portions 873 so as to hold the seat post 71 in its radial direction, and a pair of right and left second flange portions 875 extending from opposite side surfaces of the bottom plate portion 871 beyond the back plate portion 872 so as to hold the seat post 71 in its radial direction at a position below the first flange portions 874. The battery holder 87 is fixed to the seat post 71 by securing the first and second flanges 874 and 875 to the bosses 71A and 71B (see FIG. 3) formed on the seat post 71 by means of bolts 95 and 96, respectively.

A buckle 88 is provided on the opposite side of the bottom plate portion 871 (on the rear side as viewed in FIG. 6) with respect to the seat post 71 so as to be pivotably supported to the first flange portions 874 by a lateral pivot shaft 93. A substantially U-shaped stop ring 89 is supported at its opposite ends to the buckle 88 at a position 92 offset from the pivot shaft 93. A pair of circular cylindrical electrodes 108 and 109 adapted to come into electrical contact with the terminals 28 and 29 of the battery 2, respectively, are exposed to the upper surface of the bottom plate portion 871.

In mounting the battery 2 into the battery holder 87, the end surface of the battery 2 where the terminals 28 and 29 are formed is placed on the bottom plate portion 871, so that the battery 2 is positioned with respect to the battery holder 87, and the terminals 28 and 29 of the battery 2 are brought into electrical contact with the electrodes 108 and 109 on the bottom plate portion 871. A feeder unit 90 connected to the electrodes 108 and 109 is provided under the bottom plate portion 871 to supply the power through a feeder line 110 to the power unit 86.

Figure 9:
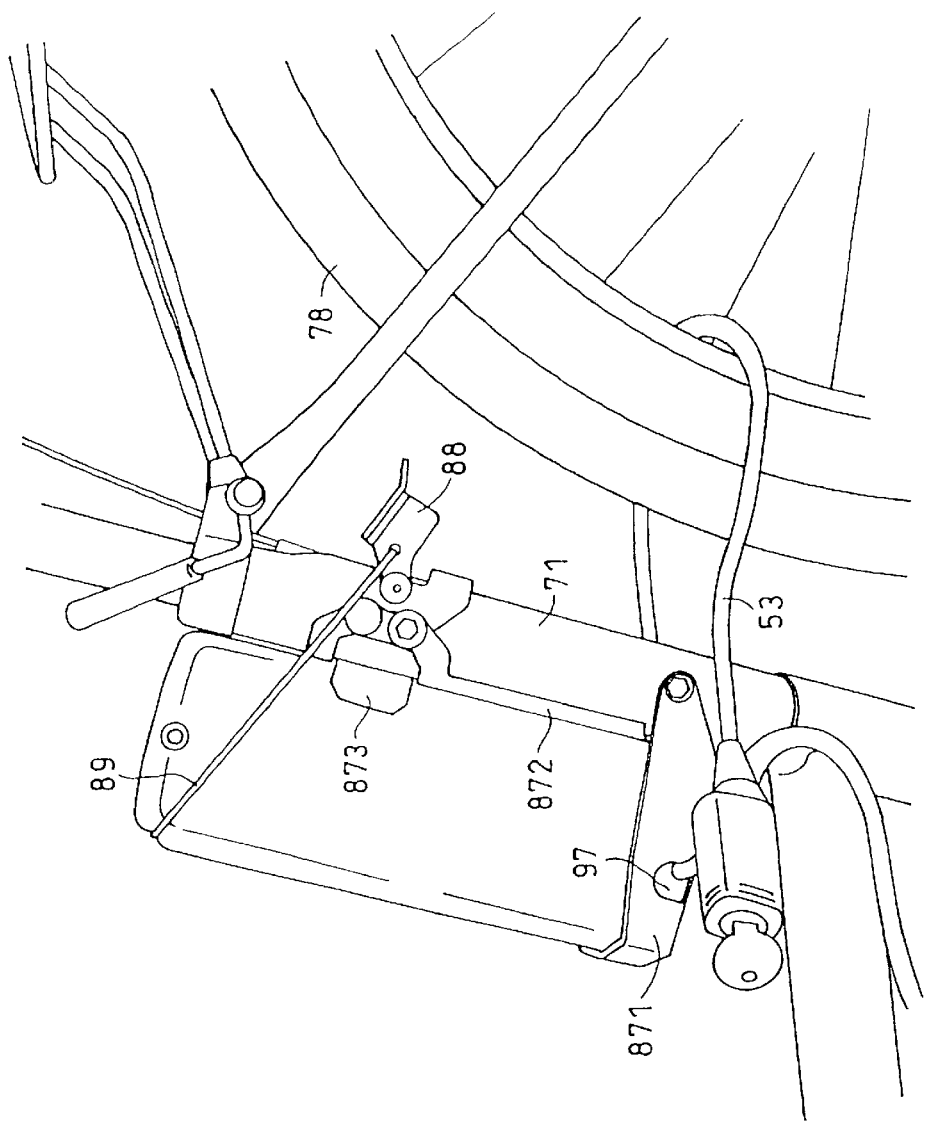
FIG. 9 is a side view of the battery holder.

As shown in FIG. 8, the battery 2 is securely fixed to the seat post 71 by first engaging the stop ring 89 with the recessed catch 46 formed at an upper end portion of the battery 2, as viewed in FIG. 8, and next rotating the buckle 88 about the pivot shaft 93 from an upper position shown in FIG. 7 to a lower position shown in FIG. 8. Further, a pair of aligned holes 97 are formed through the opposite side walls of the bottom plate portion 871 so that when the battery 2 is mounted on the battery holder 87 as shown in FIG. 8, the through hole 45 of the battery pack 26 is aligned with the holes 97. As shown in FIG. 9, a locking wire 53 is allowed to pass through the holes 97 of the battery holder 87 and the through hole 45 of the battery pack 26 and also to pass through the rear wheel 78, thereby preventing the theft of not only the power-assisted bicycle itself, but also the battery 2.

Figure 10:
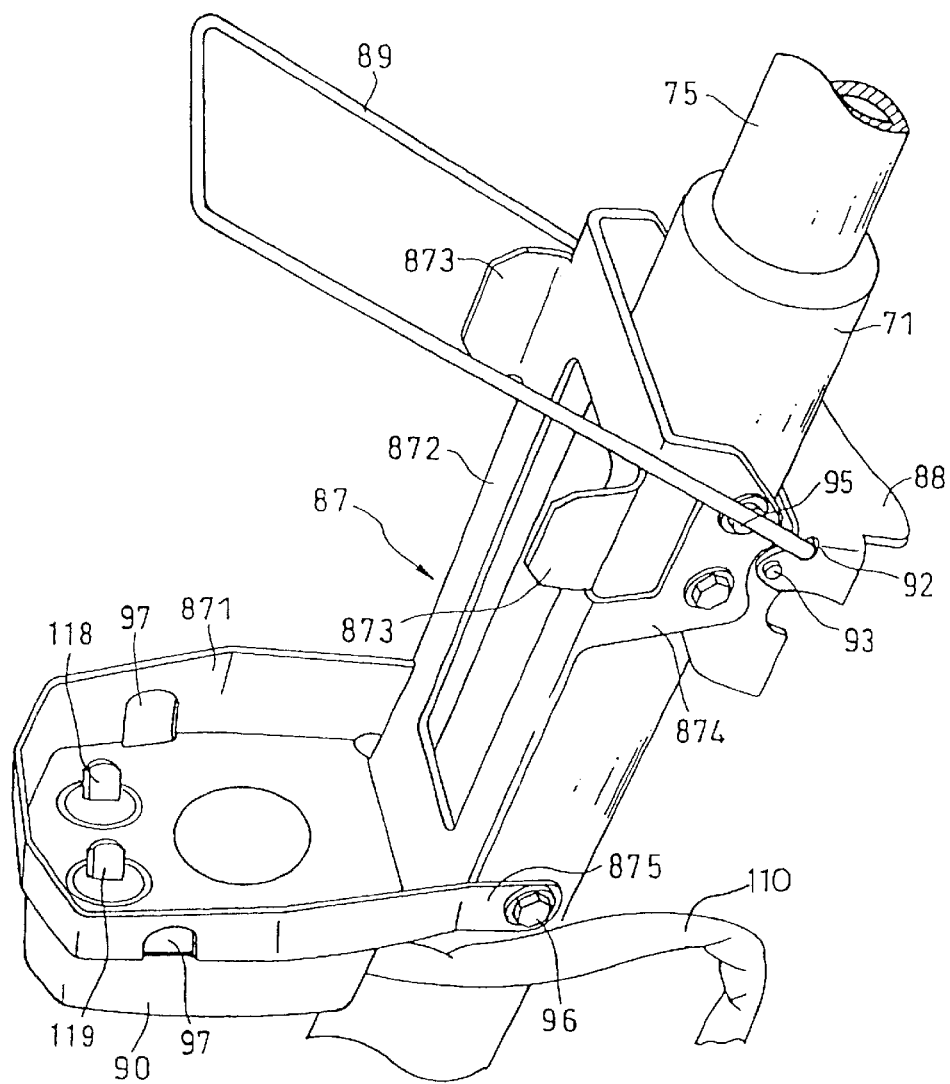
FIG. 10 is a perspective view of another embodiment of the battery holder.

The shape of the electrodes 108 and 109 exposed to the upper surface of the bottom plate portion 871 is merely illustrative, and any shape may be adopted. For example, electrodes 118 and 119 shown in FIG. 10 are general-purpose flat electrodes having specifications similar to those of an AC plug adapted to be fitted into an AC 100 V residential outlet.

Figure 11:
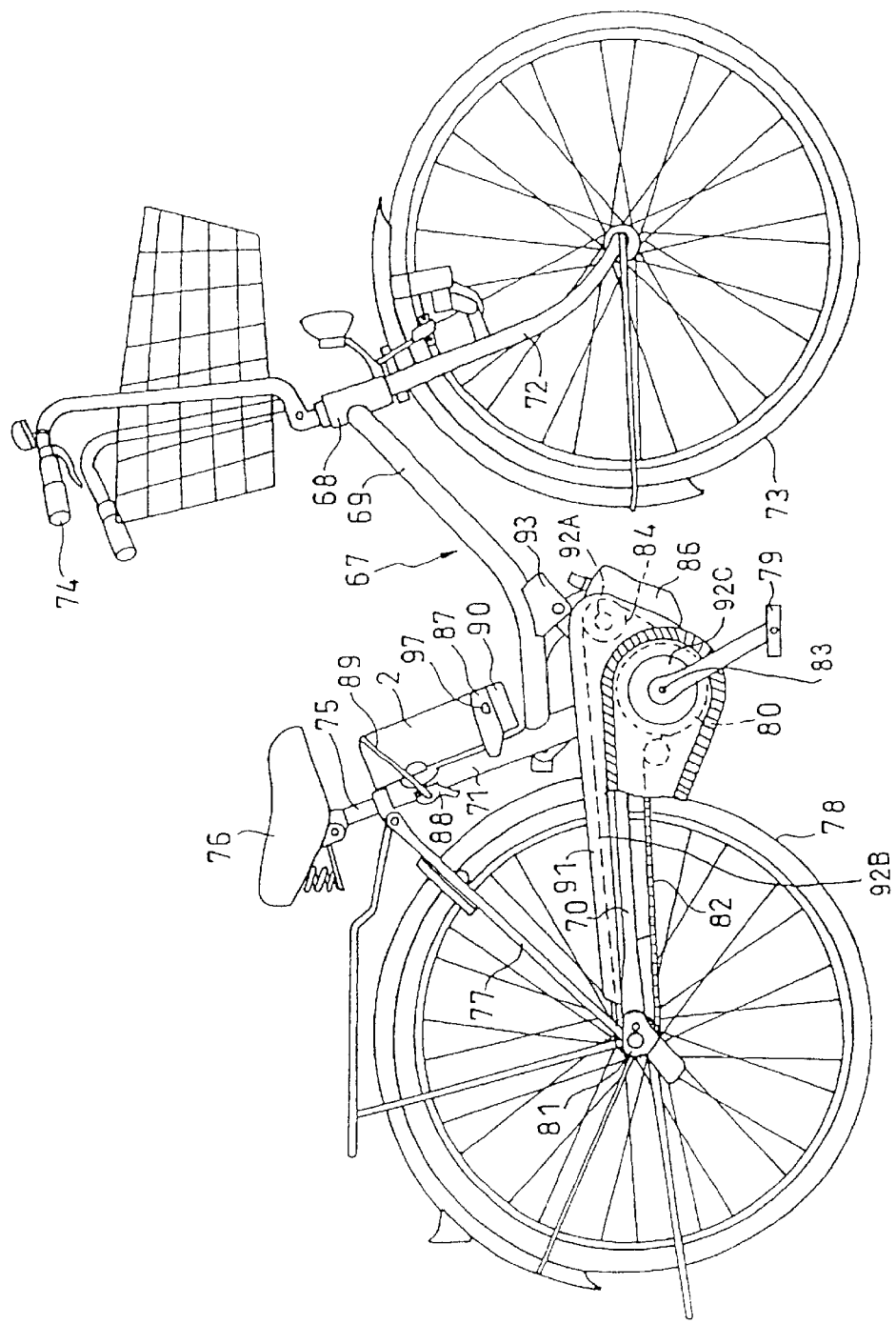
FIG. 11 is a side view of a power-assisted bicycle (F/F structure) according to a second embodiment of the present invention.

FIG. 11 is a side view of a power-assisted bicycle according to a second embodiment of the present invention. In FIG. 11, the same reference numerals as those shown in FIG. 1 denote the same or like parts.

As in the first embodiment shown in FIG. 1, the power-assisted bicycle shown in FIG. 11 also has an F/F structure such that the battery 2 is mounted on the front side (F) of the seat post 71 and the assist power generated by the power unit 86 is input into the chain line at a position on the front side (F) of the crankshaft 83. The second embodiment is slightly different from the first embodiment in the structure of the bicycle frame 67 and the shape of the chain cover 91.

Figure 12:
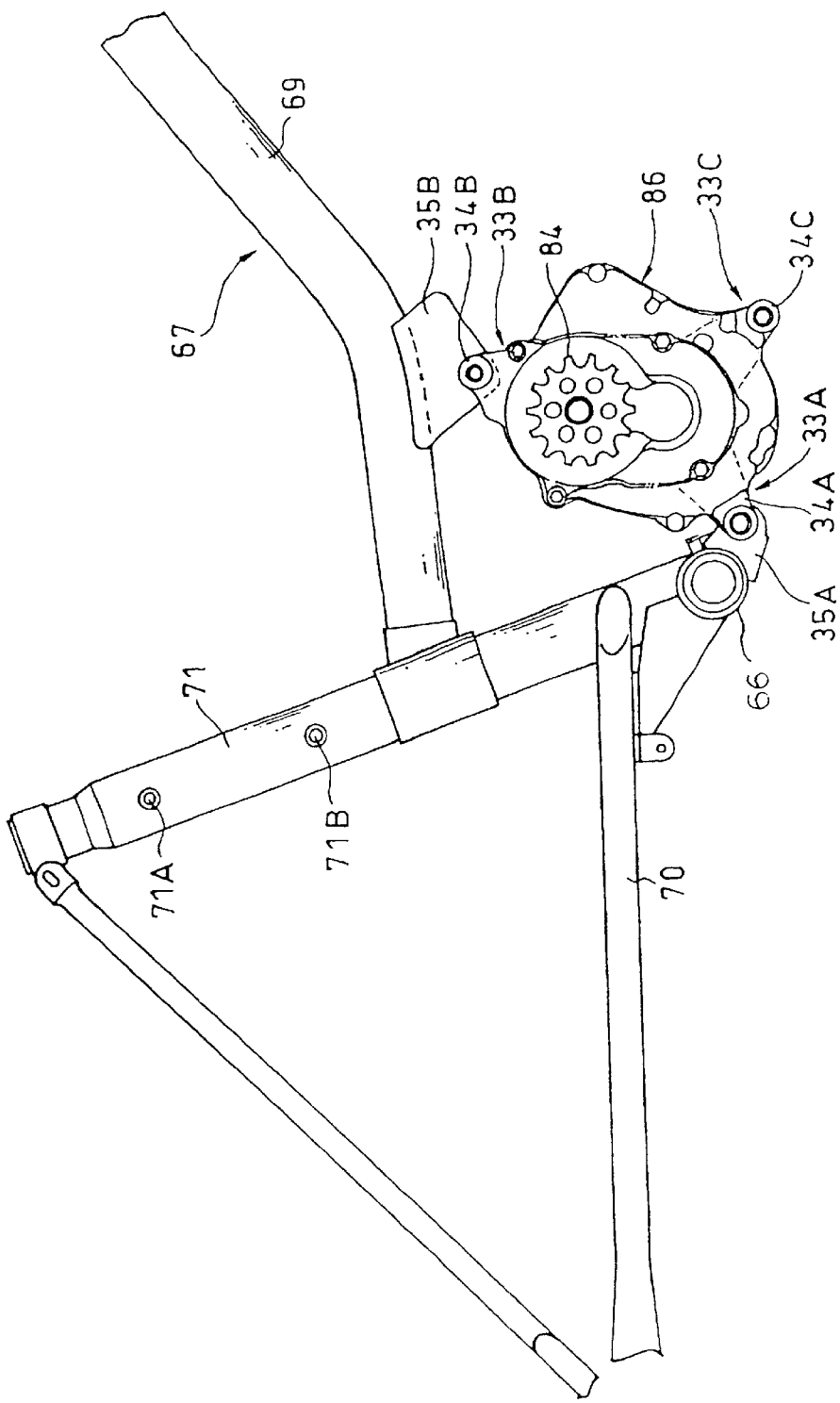
FIG. 12 is an enlarged side view of a mounting structure of a power unit to a bicycle frame in the power-assisted bicycle shown in FIG. 11.
Figure 13:
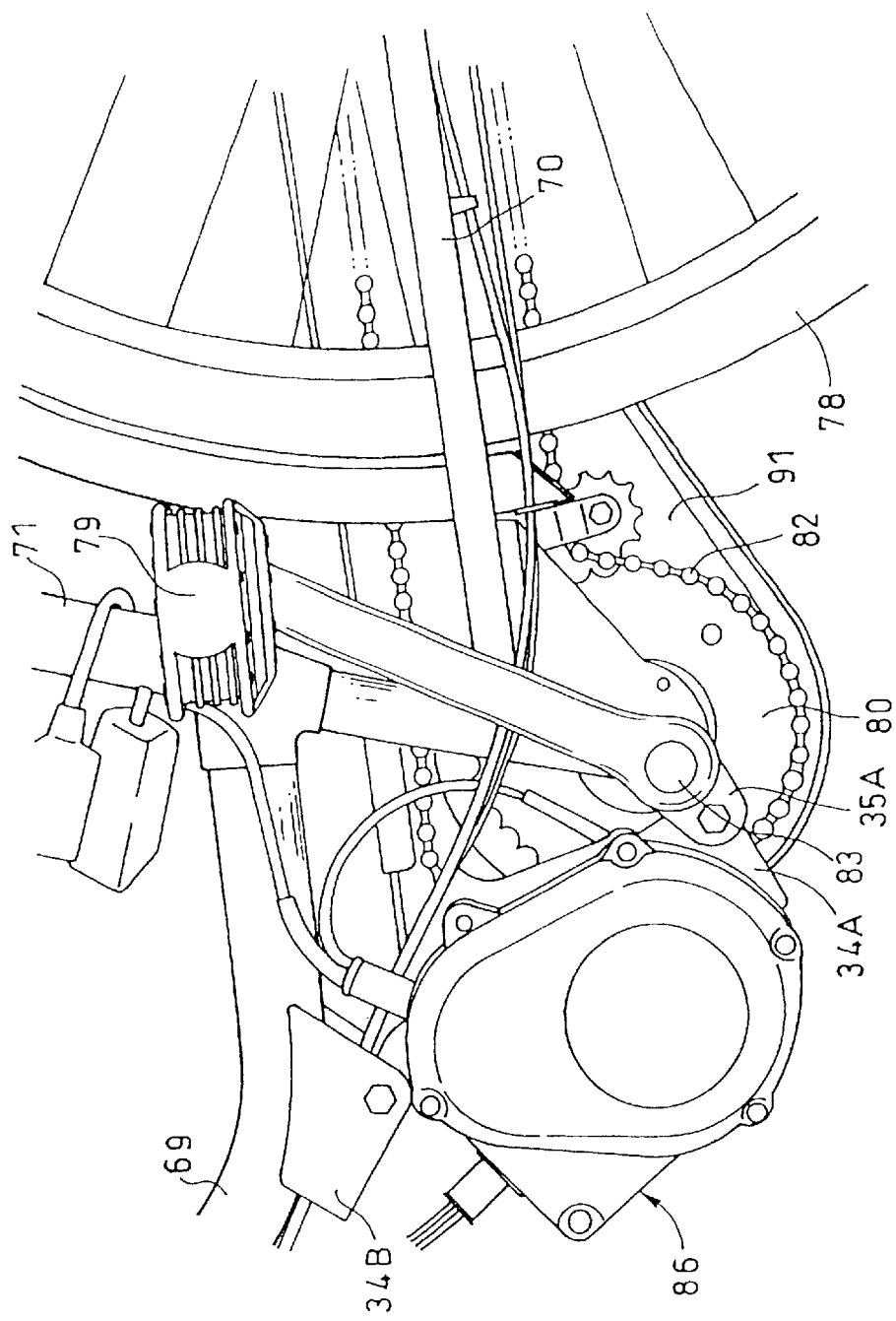
FIG. 13 is an enlarged side view showing a pedal sprocket in the power-assisted bicycle shown in FIG. 11.

FIG. 12 is an enlarged side view showing a fixing method for the power unit 86 to the bicycle frame 67 in the second embodiment, and FIG. 13 is a similar enlarged side view as seen from the back side of FIG. 11.

Also in this embodiment, the bicycle frame 67 is an existing bicycle frame designed and manufactured for a conventional bicycle. That is, as shown in FIG. 12, the flanges 35A and 35B are fixed to the support pipe 66 and the down pipe 69 of the bicycle frame 67, respectively. The power unit 86 is fixed in position and attitude to the bicycle frame 67 by bolting the two bosses 34A and 34B formed at the selected ones 33A and 33B of the three boss forming spaces 33A, 333B, and 33C to the flanges 35A and 35B, respectively, so that the drive sprocket 84 comes into mesh with the chain 82 at a position on the front side of the crankshaft 83.

While the idle boss 34C is formed at the boss forming space 33C in this embodiment, the idle boss 34C may be omitted as in the first embodiment.

Thus, the flanges 35A and 35B for fixing the power unit 86 can be fixed to any existing bicycle frame, so that the power unit 86 can be used as a common assist power source irrespective of the shapes of various bicycle frames. Accordingly, the power unit 86 can be commonly used for various bicycle frames by minor modification.

Also in this embodiment, the chain cover 91 has an integral structure composed of a drive sprocket cover portion 92A for covering the drive sprocket 84, a chain cover portion 92B for covering the stretched portion of the chain 82, and a pedal sprocket cover portion 92C for covering the upper half of the pedal sprocket 80 as shown in FIG. 11. Unlike the first embodiment, however, a dark color is applied to an area of the pedal sprocket cover portion 92C corresponding to the outline of the pedal sprocket 80, and no particular visual modification is applied to the drive sprocket cover portion 92A. This subdues the visual impression of the drive sprocket 84.

Figure 14:
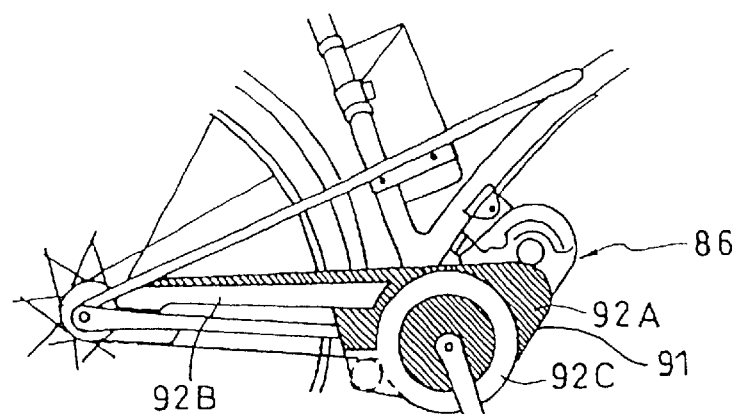
FIG. 14 is a side view of a modification (F/F structure) of a chain cover of the power-assisted bicycle according to the second embodiment.
Figure 15:
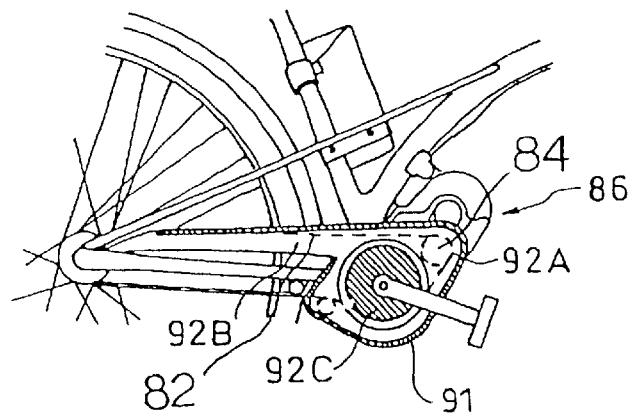
FIG. 15 is a side view of another modification (F/F structure) of a chain cover of the power-assisted bicycle according to the second embodiment.
Figure 16:
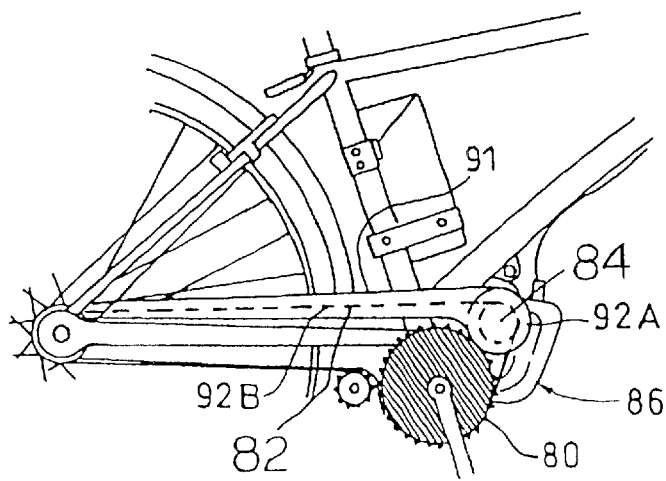
FIG. 16 is a side view showing still another modification (F/F structure) of a chain cover of the power-assisted bicycle according to the second embodiment.

FIGS. 14, 15, and 16 are side views of various modifications of a similar F/F type power-assisted bicycle, in which the same reference numerals denote the same or like parts. These modifications are similar to the first and second embodiments in the mounting method for the power unit 86 to the bicycle frame 67, and differ in the chain cover 91.

In the power-assisted bicycle shown in FIG. 14, the drive sprocket (not shown), the stretched portion of the chain (not shown), and the pedal sprocket (not shown) are all fully covered with the single chain cover 91. The chain cover portion 92B and the pedal sprocket cover portion 92C may be coated with the same bright color, and the drive sprocket cover portion 92A has a shape so as to be continuous to the other portion which may be coated with a dark color, so as to ensure a minimal visual impression of the drive sprocket 84.

In the power-assisted bicycle shown in FIG. 15, the drive sprocket 84, the stretched portion of the chain 82, and the pedal sprocket (not shown) are all fully covered with the single chain cover 91. The drive sprocket cover portion 92A has such a shape as to be continuous to the chain cover portion 92B coated with the same color, so as to ensure a minimal visual impression of the drive sprocket 84.

In the power-assisted bicycle shown in FIG. 16, the drive sprocket 84 and the stretched portion of the chain 82 are all fully covered with the single chain cover 91. The drive sprocket cover portion 92A and the chain cover portion 92B have the same color, so as subdue the visual impression of the drive sprocket 84.

According to each chain cover 91 mentioned above, the drive sprocket cover portion 92A is inconspicuous. Therefore the appearance of the bicycle after the addition of the drive sprocket cover portion 92A can be improved, and it is possible to achieve any desirable design of the chain cover 91 independently of the presence of the drive sprocket cover portion 92A.

Figure 17:
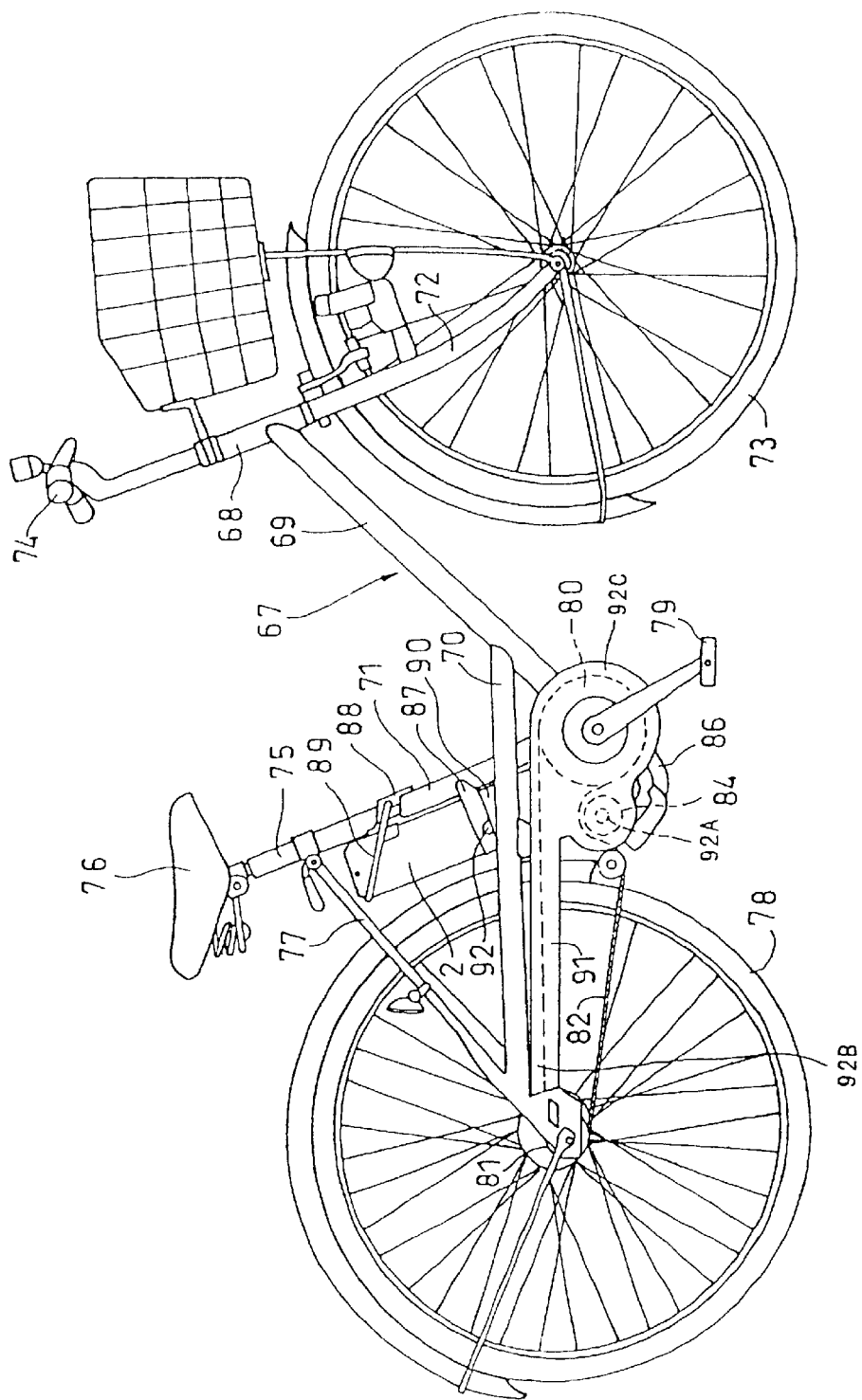
FIG. 17 is a side view of a power-assisted bicycle (R/R structure) according to a third embodiment of the present invention.

FIG. 17 is a side view of a power-assisted bicycle according to a third embodiment of the present invention, in which the same reference numerals as those shown in FIG. 1 denote the same or like parts. Also in this embodiment, the bicycle frame 67 is an existing bicycle frame designed and manufactured for a conventional bicycle.

Unlike the first and second embodiments, the third embodiment adopts an R/R structure such that the battery 2 is mounted on the rear side (R) of the seat post 71 and the assist power generated by the power unit 86 is input into the chain line at a position on the rear side (R) of the crankshaft 83.

Figure 18:
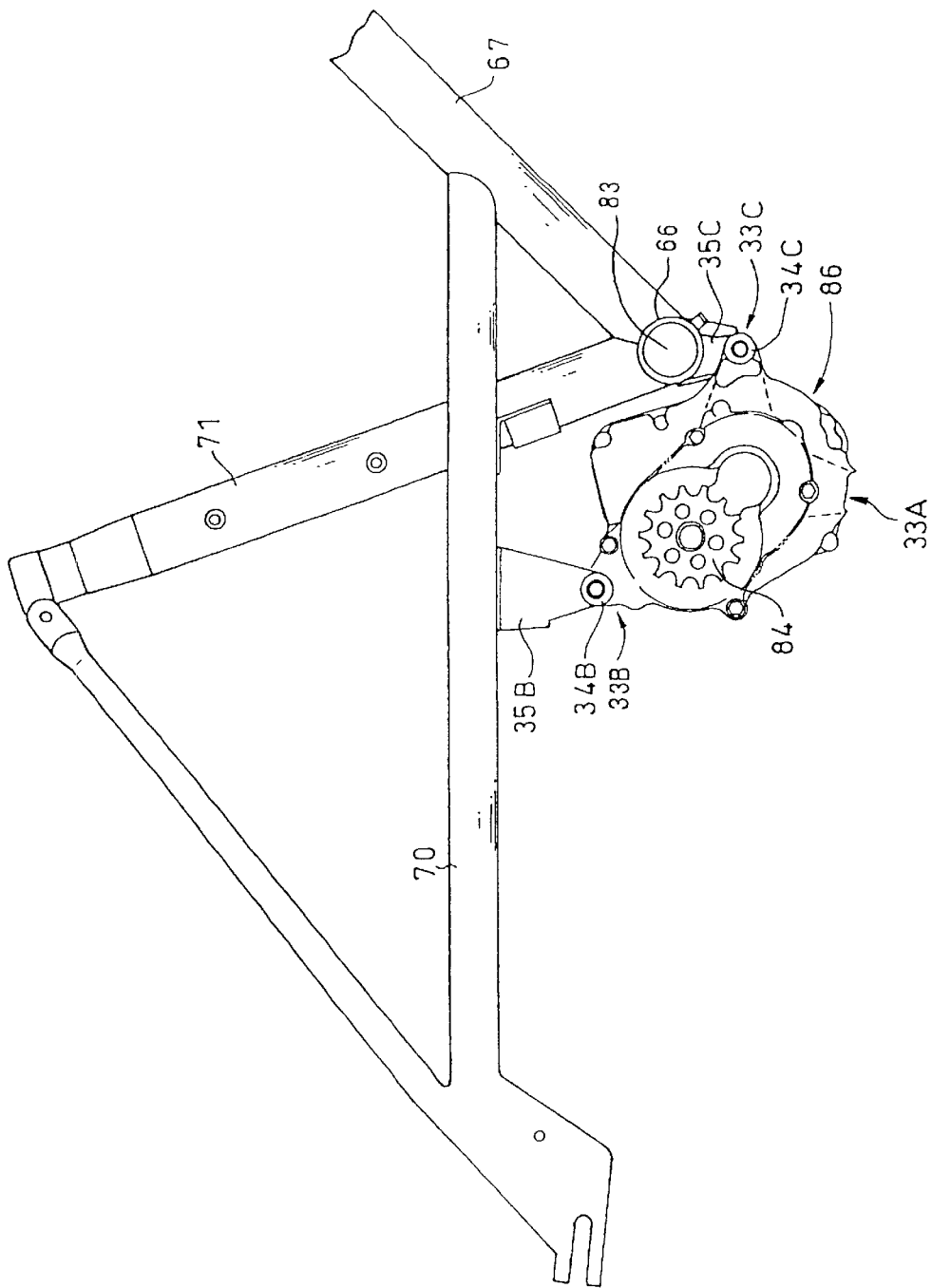
FIG. 18 is an enlarged side view of a mounting structure of a power unit to a bicycle frame in the power-assisted bicycle shown in FIG. 17.
Figure 19:
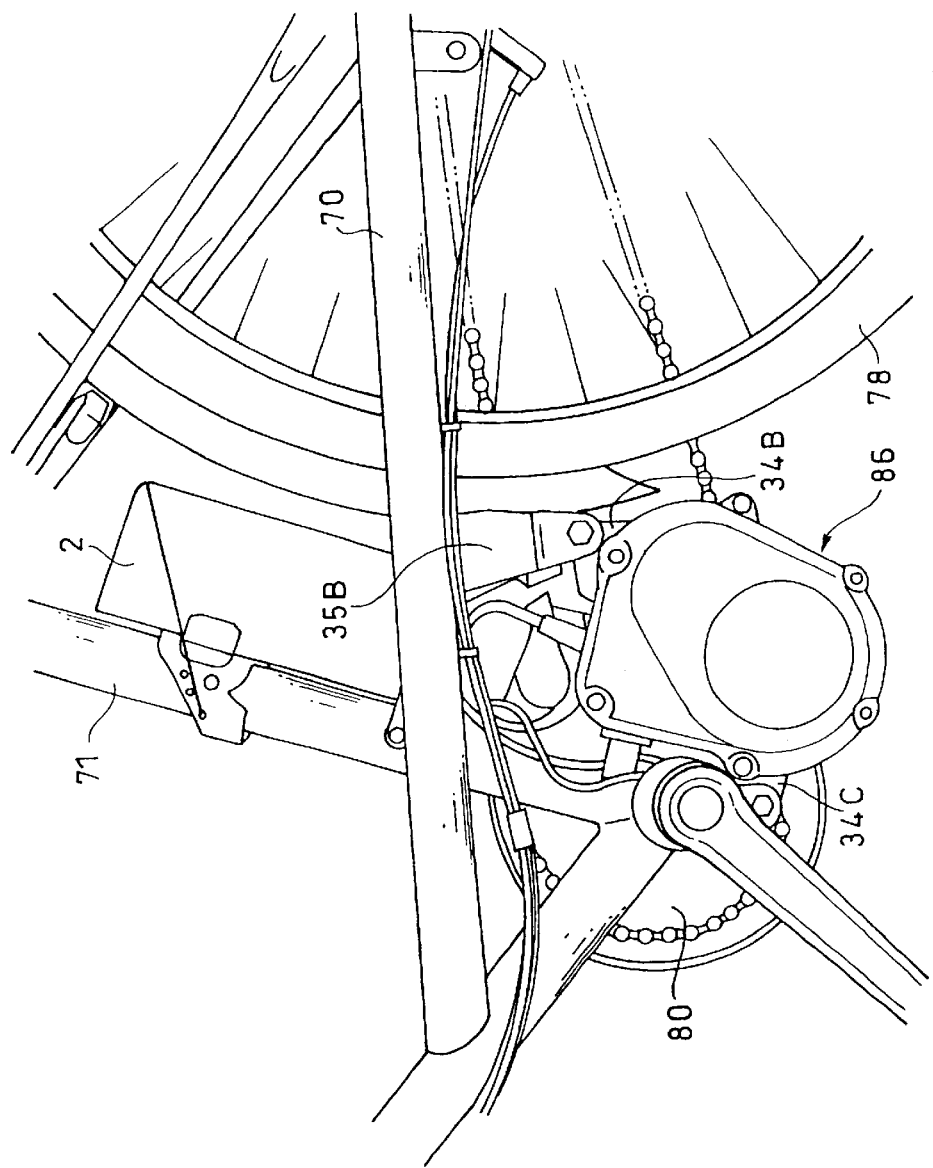
FIG. 19 is an enlarged side view of a pedal sprocket in the power-assisted bicycle shown in FIG. 17.

FIG. 18 is an enlarged side view showing a fixing method for the power unit 86 to the bicycle frame 67 in the third embodiment, and FIG. 19 is a similar enlarged side view as seen from the back side of FIG. 17.

As shown in FIG. 18, flanges 35C and 35B are fixed to the support pipe 66 and the rear fork 70 of the bicycle frame 67, respectively. The power unit 86 has three boss forming spaces 33A, 33B, and 33C, and two bosses 34C and 34B are formed at the boss forming spaces 33C and 33B, respectively. The two bosses 34C and 34B are bolted to the two flanges 35C and 35B, respectively, thus positioning the power unit 86 so that the drive sprocket 84 comes into mesh with the chain 82 at a position on the rear side of the crankshaft 83. In this embodiment, the boss 34A to be formed at the boss forming space 33A is omitted.

As shown in FIG. 17, the chain cover 91 has an integral structure composed of a drive sprocket cover portion 92A, a chain cover portion 92B, and a pedal sprocket cover portion 92C. The drive sprocket cover portion 92A has the same color as that of the chain cover portion 92B and the pedal sprocket cover portion 92C, thereby making the drive sprocket cover portion 92A appear continuous with the other portions 92B and 92C.

Figure 20:
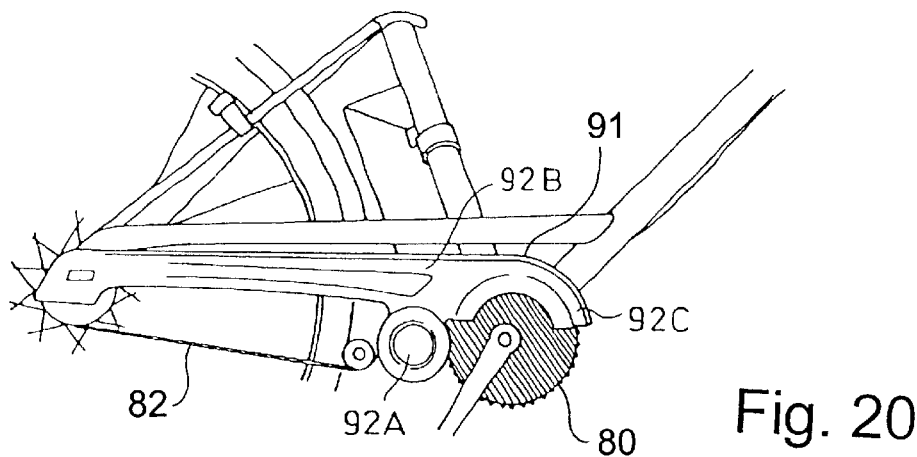
FIG. 20 is a side view of a modification (R/R structure) of the power-assisted bicycle according to the third embodiment.
Figure 21:
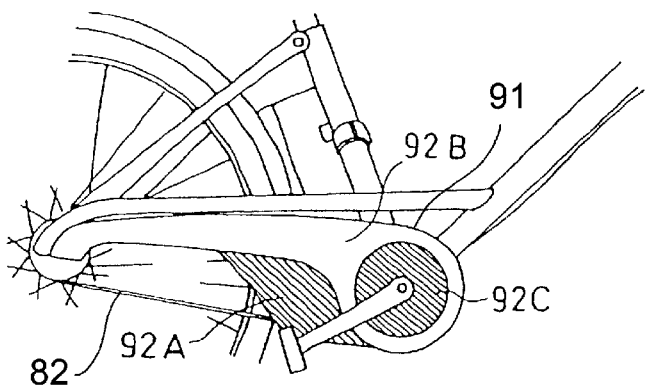
FIG. 21 is a side view of another modification (R/R structure) of the power-assisted bicycle according to the third embodiment.
Figure 22:
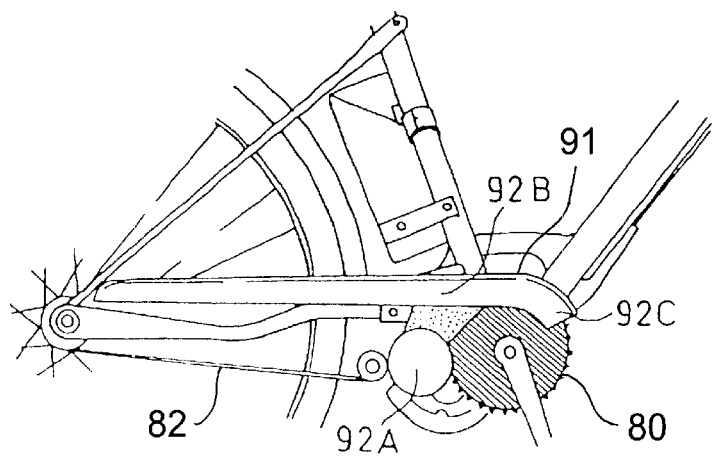
FIG. 22 is a side view of still another modification (R/R structure) of the power-assisted bicycle according to the third embodiment.

FIGS. 20, 21, and 22 are side views of various modifications of the third embodiment. In FIGS. 20 to 22, the same reference numerals as those shown in FIG. 17 denote the same or like parts. These modifications are similar to the third embodiment in the mounting method for the power unit 86 to the bicycle frame 67, and differ in the chain cover 91.

In the power-assisted bicycle shown in FIG. 20, the drive sprocket 84, the stretched portion of the chain 82, and an upper portion of the pedal sprocket 80 are covered with the single chain cover 91. The drive sprocket cover portion 92A has a circular shape corresponding to the outside shape of the drive sprocket (not shown) and this circular portion is utilized for its aesthetic appeal.

In the power-assisted bicycle shown in FIG. 21, the drive sprocket (not shown), the stretched portion of the chain 82, and the pedal sprocket (not shown) are all fully covered with the single chain cover 91. The drive sprocket cover portion 92A and the pedal sprocket cover portion 92C may be coated with the same dark color, so as to subdue the visual impression of the drive sprocket (not shown).

In the power-assisted bicycle shown in FIG. 22, the drive sprocket (not shown), the stretched portion of the chain 82, and an upper portion of the pedal sprocket 80 are all covered with the single chain cover 91. The drive sprocket cover portion 92A has an independent shape in design, and can serve as a kind of ornament.

Figure 23:
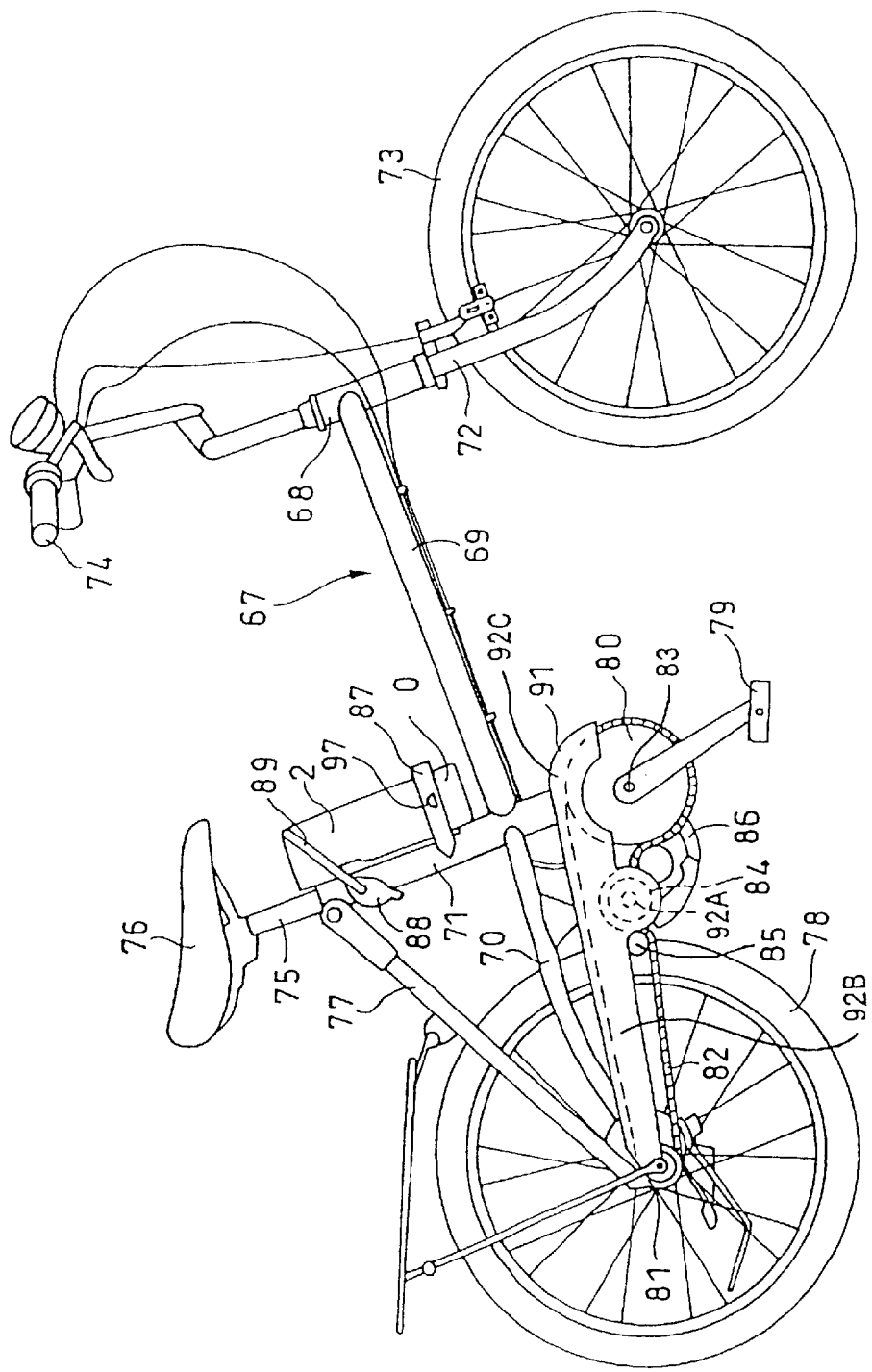
FIG. 23 is a side view of a power-assisted bicycle (F/R structure) according to a fourth embodiment of the present invention.

FIG. 23 is a side view of a power-assisted bicycle according to a fourth embodiment of the present invention, in which the same reference numerals as those shown in FIG. 1 denote the same or like parts.

In this embodiment, the bicycle frame 67 is an existing bicycle frame designed and manufactured for a conventional bicycle. Unlike the first embodiment, the fourth embodiment employs an F/R structure such that the battery 2 is mounted on the front side (F) of the seat post 71 and the assist power generated by the power unit 86 is input into the chain line at a position on the rear side (R) of the crankshaft 83.

Also in this case where the drive sprocket 84 is located on the rear side of the crankshaft 83, the chain cover 91 is suitably designed in shape or color to thereby improve appearance of the bicycle after the addition of the drive sprocket cover portion 92A, thus allowing any desirable design of the chain cover 91, independent of the presence of the drive sprocket cover portion 92A.

Figure 24:
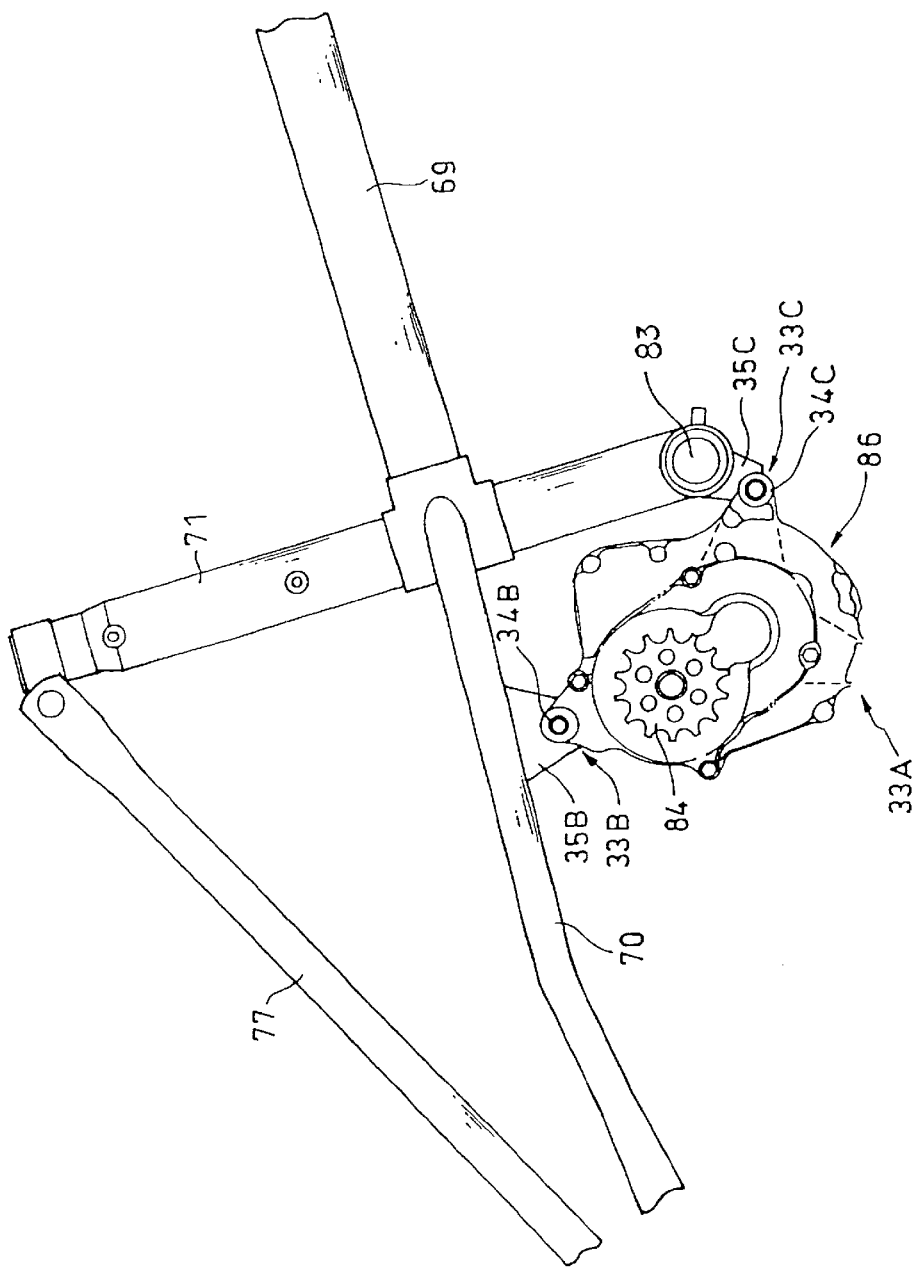
FIG. 24 is an enlarged side view of a mounting structure of a power unit to a bicycle frame in the power-assisted bicycle shown in FIG. 23.
Figure 25:
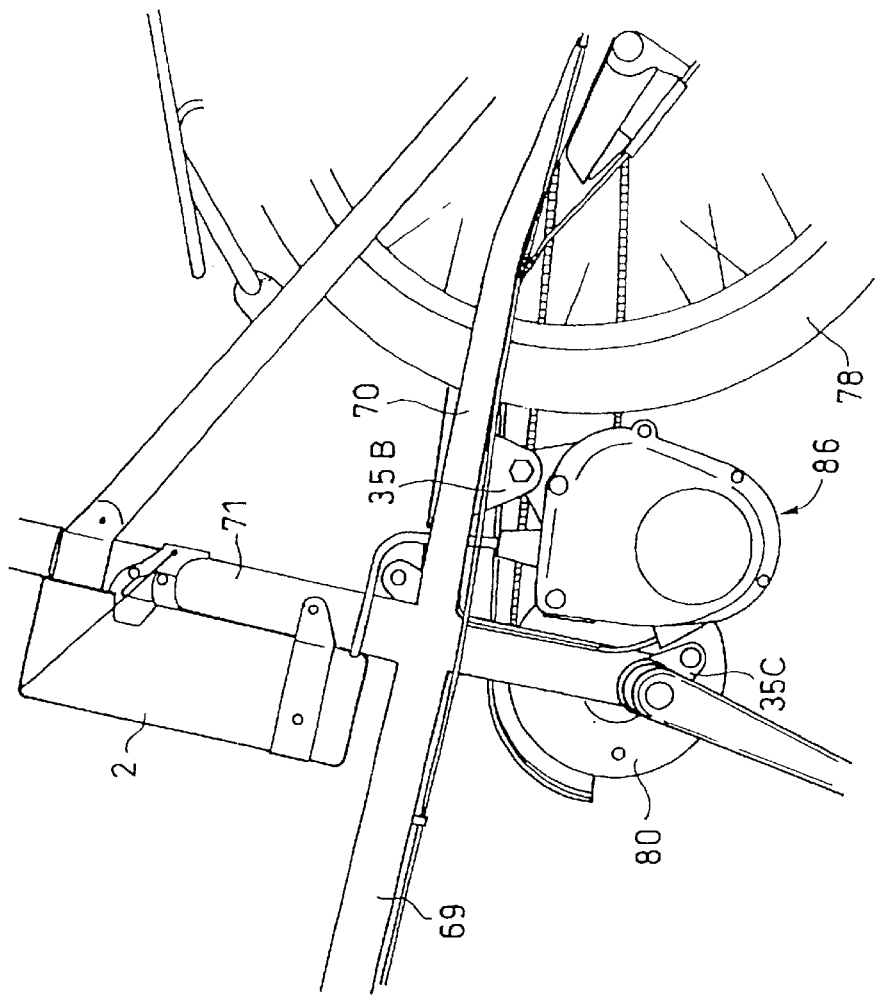
FIG. 25 is an enlarged side view of a pedal sprocket in the power-assisted bicycle shown in FIG. 23.

FIG. 24 is an enlarged side view showing a fixing method for the power unit 86 to the bicycle frame 67 in this embodiment, and FIG. 25 is a similar enlarged side view as seen from the back side of FIG. 24.

As in the third embodiment shown in FIG. 24, flanges 35C and 35B are fixed to the support pipe 66 and the rear fork 70 of the bicycle frame 67, respectively, and the power unit 86 is fixed in position and attitude to the bicycle frame 67 so that the drive sprocket 84 is in mesh with the chain 82 at a position on the rear side of the crankshaft 83, by bolting the two bosses 34C and 34B to the two flanges 35C and 35B, respectively. Also in this embodiment, the boss 35A to be formed at the boss forming space 33A is omitted.

The chain cover 91 in this embodiment is similar to that shown in FIG. 20. That is, the drive sprocket 84, the stretched portion of the chain 82, and an upper portion of the pedal sprocket 80 are all covered with the single chain cover 91, and the drive sprocket cover 92A has a circular shape corresponding to the outside shape of the drive sprocket 84 so that the circular portion may serve as a kind of ornament.

In each embodiment mentioned above, an existing bicycle frame designed and manufactured for a conventional bicycle is used, and flanges are fixed to the bicycle frame at specific positions. Further, the power unit has a plurality of bosses to be selectively used and connected to the flanges. Accordingly, the power unit can be mounted on the bicycle frame at a specific position in a specific attitude, depending on the kind of the existing bicycle frame. Thus, the power unit can be used for various existing bicycle frames.

Furthermore, in each embodiment mentioned above, the drive sprocket 84, the stretched portion of the chain 82, and the pedal sprocket 80 are covered with the single chain cover 91. The drive sprocket cover portion 92A is made positively different in shape or color from the other cover portions 92B and 92C for the purpose of positive utilization as a kind of ornament, or is made continuous in shape and color to the other cover portions 92B and 92C to subdue the visual impression of the drive sprocket 84. Thus, the design limit due to the presence of the drive sprocket cover portion 92A can be minimized.

While the battery 2 mounted on the power-assisted bicycle is typically owned by an individual, there is a recent growing interest in a battery exchanging system such that a returned battery is replaced by a recharged battery that can be rented, and that such recharged batteries are stocked for renting.

Figure 26:
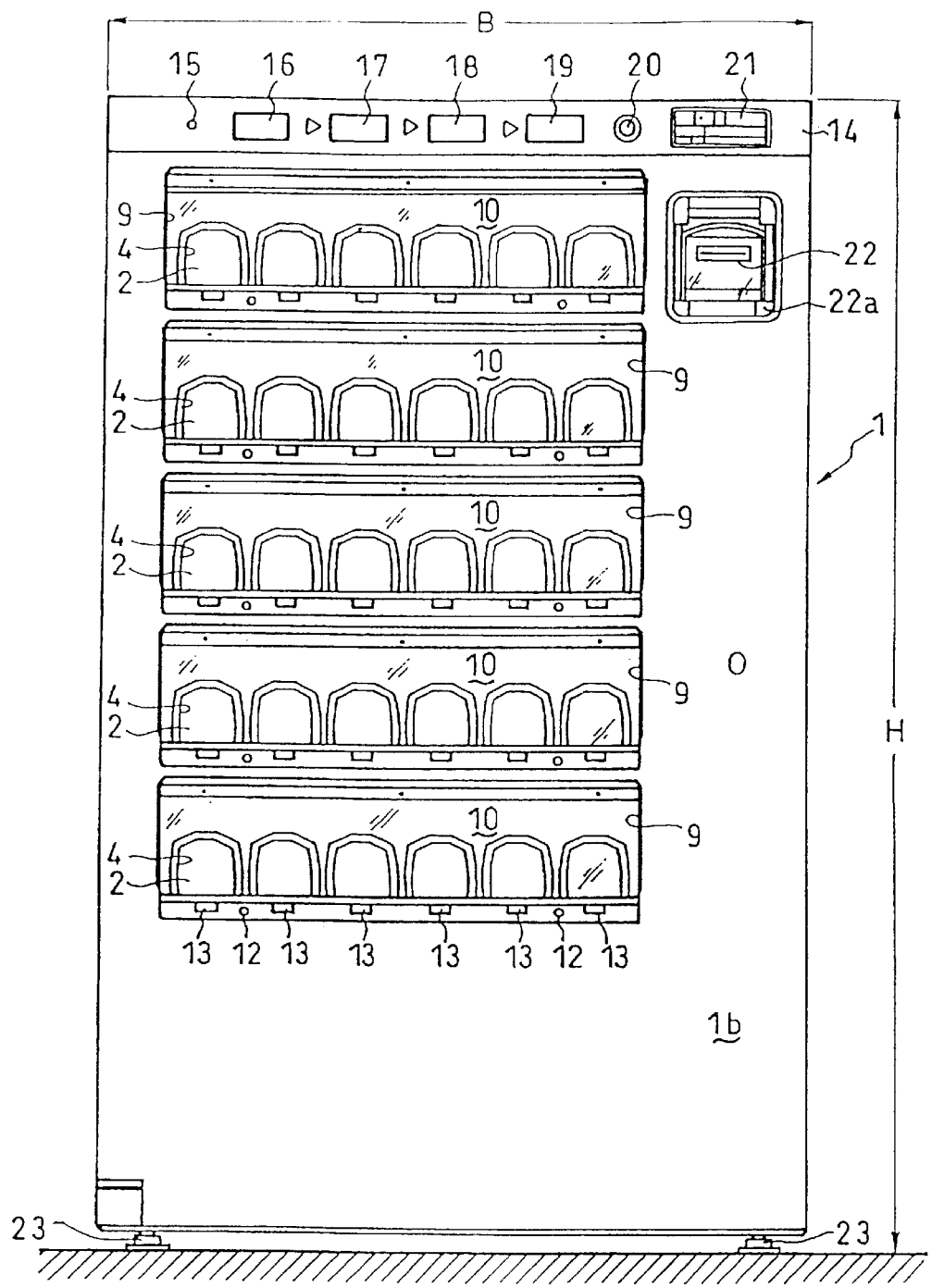
FIG. 26 is a front elevational view of a battery exchanging machine.
Figure 27:
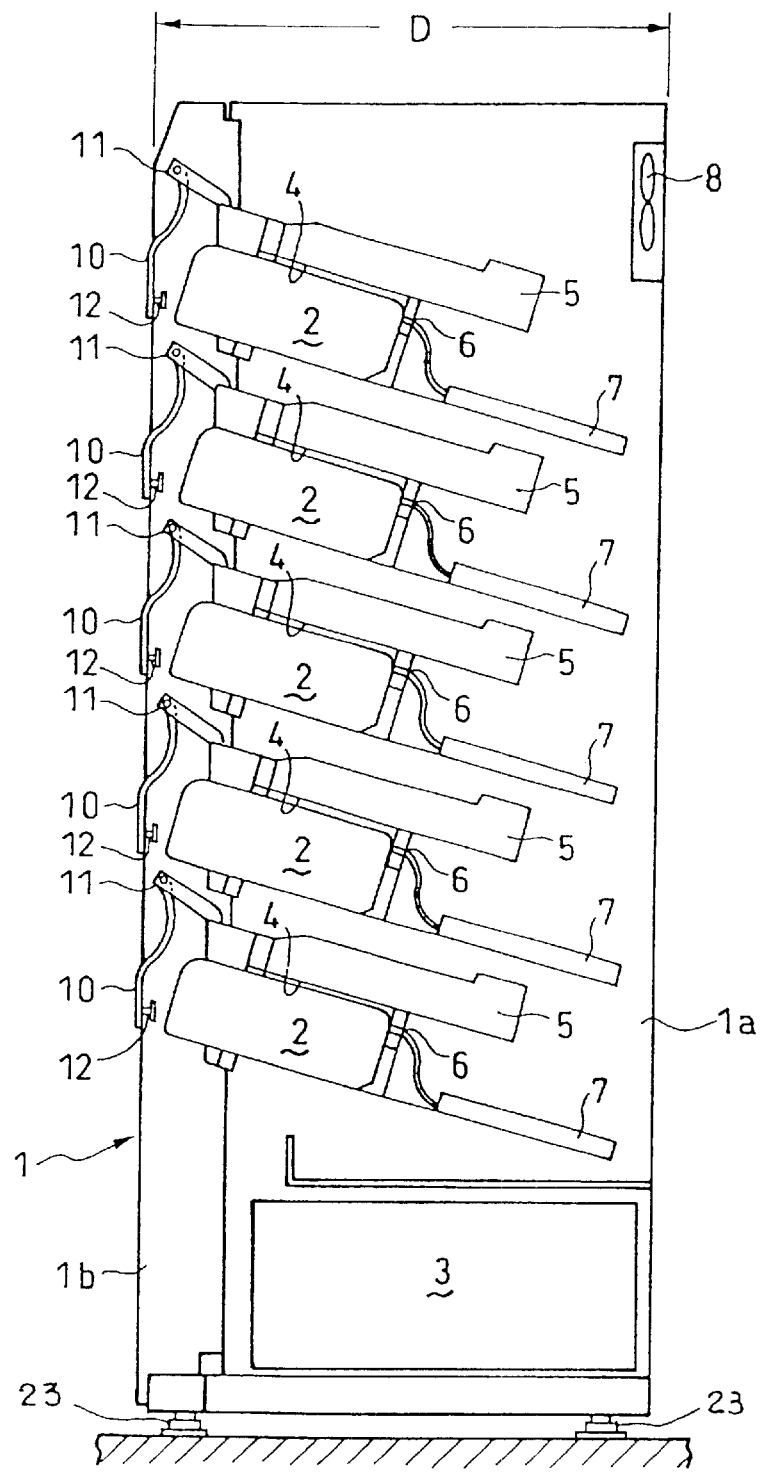
FIG. 27 is a sectional side view of the battery exchanging machine.

FIG. 26 is a front elevational view of a battery exchanging machine 1 for recharging and exchanging the battery 2, and FIG. 27 is sectional side view of the battery exchanging machine 1. The battery exchanging machine 1 is constructed as a rectangular cylindrical box in external appearance. The box is composed generally of a body 1a having a front opening and a space for accommodating a plurality of batteries 2 and a controller (including a power supply unit and a control unit) 3 and a front cover 1b for closing the front opening of the body 1a.

The body 1a is provided with a plurality of slots 4, arranged six slots in a row by five stages for respectively accommodating the batteries 2. That is, the battery exchanging machine 1 shown in FIG. 26 can accommodate thirty batteries at a time. Each slot 4 has a holding mechanism 5 for the battery 2. The bottom or rear wall surface of each slot 4 is provided with terminals 6 for recharging of the battery 2. The terminals 6 are connected to a recharger 7.

Each slot 4 has sensor means for detecting that the battery 2 has been inserted. When the battery 2 is inserted into the slot 4, the recharger 7 is operated to recharge the battery 2. Starting of the detection and recharging of the battery 2 can be instructed by the controller 3. The control unit in the controller 3 has control means including a register capable of recognizing the slot 4 accommodating the recharged battery 2. The control unit in the controller 3 controls indicator means to perform recharged battery indication according to the contents in the register. While the recharger 7 is provided for each slot 4 in this embodiment, it may be used commonly for three slots 4, for example.

A ventilation fan 8 is provided on the back surface of the body 1a at an upper portion thereof. If the battery exchanging machine 1 is provided with air conditioning means, a large space for installing the air conditioning means is required, and it becomes unsuitable for indoor use. From this point of view, this preferred embodiment employs the ventilation fan 8 to merely ventilate the inside air of the machine 1 to the outside air (the atmosphere at the installation site of the machine 1) without using any air conditioning means requiring a large installation space. As a result, the battery exchanging machine 1 can be made compact.

The front cover 1b is provided with a plurality of laterally elongated windows 9 arranged in five stages corresponding to the arrangement of the slots 4. Each window 9 is provided with a door 10 for commonly covering the front openings of the six slots 4 in the same stage.

The door 10 may be formed from a transparent plastic plate, and it is openably supported at its upper end by a hinge 11. The lower edge portion of each window 9 is provided with a stopper 12 against which the back surface of the door 10 at its lower end portion comes into abutment when closing the door 10. The stopper 12 is preferably formed of an elastic material such as rubber, having a shock absorbing function. Further, each window 9 is provided with six indication lamps (e.g., LEDs) 13 respectively corresponding to the six slots 4 in the same stage. When any one of the indication lamps 13 is on or flashed, a user is allowed to get access to the slot 4 and the battery 2 corresponding to this indication lamp 13. For convenience of illustration, the reference numerals 12 and 13 respectively denote the stoppers and the indication lamps for the slots 4 in the lowermost stage in FIG. 26.

The number of slots 4 for accommodating the batteries 2 is not limited to the above-mentioned number. Further, each window 9 may be made vertically elongated so as to cover the slots 4 in the same stage. In this case, each door 10 also becomes vertically elongated, and is preferably supported by a hinge having a vertically extending pivot shaft. Further, the doors 10 may be used for only a required number of windows 9 according to the number of slots 4, and in the case that the number of slots 4 is small, the idle window or windows 9 may be closed by covers. In the case that the number of slots 4 is increased, the closed window or windows 9 may be opened and the corresponding door or doors 10 may be provided accordingly.

A display panel 14 is formed on an upper portion of the front door 1b. The display panel 14 is provided with a power lamp 15, a preparation indicator 16, operation procedure indicators 17, 18, and 19, a card return lamp 20, and a remaining accessible count on card indicator 21. Each of the preparation indicator 16 and the operation procedure indicators 17, 18, and 19 is composed of a display panel in which a specific message is preliminarily written and a lamp for illuminating the display panel. For example, a message of "IN PREPARATION" is displayed on the preparation indicator 16, a message of "INSERT BATTERY INTO THE SLOT INDICATED BY THE FLASHING LAMP" is displayed on the operation procedure indicator 17, a message of "INSERT CARD" is displayed on the operation procedure indicator 18, and a message of "TAKE BATTERY OUT OF THE SLOT INDICATED BY THE FLASHING LAMP" is displayed on the operation procedure indicator 19.

A card slot 22 for insertion of a prepaid card is also formed on the front cover 1b at a position on the right side of the window 9 in the uppermost stage. The card slot 22 may be provided with an openable transparent plastic cover 22a.

Further, four feet 23 are provided on the bottom of the battery exchanging machine 1. The battery exchanging machine 1 may have a height H of 120 cm, a depth D of 45 cm, and a breadth B of 72.5 cm. Of these dimensions, the height H is set preferably in consideration of ease of loading and unloading of the batteries 2 from an ergonomic point of view, the visibility of the machine 1 in the case of installation in a public place, and appearance in the case of arranging the machine 1 with other article display stands. In these circumstances, the height H of the machine 1 is set preferably to 120±10 cm.

The operation of the battery exchanging machine 1 will now be described.

In the case that no recharged batteries 2 are present in the machine 1, the preparation indicator 16 is on to stay showing the message of "IN PREPARATION".

In the case that at least one recharged battery 2 is present, the preparation indicator 16 is turned off to make the message of "IN PREPARATION" disappear and instead the operation procedure indicator 17 is turned on to show the message of "INSERT BATTERY INTO THE SLOT INDICATED BY THE FLASHING LAMP". The indicator lamp or lamps 13 corresponding to the other empty slot or slots 4 is/are kept on. In the case that the plural empty slots 4 are present, all the corresponding indicator lamps 13 may be turned on, or one of the indicator lamps 13 corresponding to any selected one of the slots 4 may be turned on for the purpose of averaged use of the slots 4.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A battery mounting structure for mounting a battery on a bicycle having a frame and a seat post, the structure comprising:
    a battery holder engageable with the seat post and including a base plate portion, the base plate portion being engageable with the battery;
    a buckle pivotably supportable on the seat post; and
    a stop ring formed to be substantially U-shaped for holding the battery in engagement with the base plate portion of the battery holder, wherein
    the battery holder is engageable with one of a front or a rear side of the seat post, the buckle being disposed on the other of said sides, and wherein
    the buckle is operatively connected to the stop ring, the buckle being movable from a first position to a second position, the stop ring being brought into secure engagement with the battery when the buckle is moved from the first position to the second position.

2. The battery mounting structure of claim 1, wherein the base plate portion is disposed at a lower end of the battery mounting structure and is engageable with a lower end of the battery.

3. The battery mounting structure of claim 1, wherein the buckle is supportable on the seat post by a pivot shaft.

4. The battery mounting structure of claim 1, wherein the stop ring is engageable with a recess on an upper edge of the battery.

5. The battery mounting structure of claim 1, wherein the base plate portion of the battery holder has a pair of opposed side walls.

6. The battery mounting structure of claim 5, wherein:
    each side wall includes a locking hole for insertion of a locking wire; and
    the battery includes a through hole communicatable with the locking holes when the battery is engaged with the base plate portion, the battery holder and the battery being securable together by inserting a locking wire through the locking holes and the through hole.

7. The battery mounting structure of claim 1, wherein electrodes are disposed on an upper surface of the base plate portion of the battery holder.

8. The battery mounting structure of claim 1, wherein the battery holder further includes a back plate portion extending upwardly from a side surface of the base plate portion.

9. The battery mounting structure of claim 8, wherein the back plate portion includes side plate portions extending from an end portion of the back plate portion, the side plate portions being engageable with the battery for positioning the battery in a lateral direction.

10. The battery mounting structure of claim 8, wherein the back plate portion includes flange portions extending from an end portion of the back plate portion, the flange portions being disposable on sides of the seat post and having apertures for accommodating bolts to bolt the back plate portion to the seat post.

11. The battery mounting structure of claim 1, wherein the battery holder is fixable to the seat post at at least one pair of bosses formed on the seat post.

12. The battery mounting structure of claim 8, wherein the stop ring is pivotably mounted to opposed side portions of the buckle.

13. A battery mounting structure for mounting a battery on a bicycle having a frame and a seat post, the structure comprising:
    a battery holder engageable with the seat post and including a base plate portion, the base plate portion being engageable with the battery;
    a buckle pivotably supportable on the seat post; and
    a stop ring formed to be substantially U-shaped for holding the battery in engagement with the base plate portion of the battery holder in accordance with the pivotable movement of said buckle, wherein
    the battery holder is engageable with one of a front or a rear side of the seat post, the buckle being disposed on the other of said sides.

* * * * *